(12) United States Patent
Inakagata et al.

(10) Patent No.: US 12,474,840 B2
(45) Date of Patent: Nov. 18, 2025

(54) MEMORY SYSTEM

(71) Applicant: Kioxia Corporation, Tokyo (JP)

(72) Inventors: Kenta Inakagata, Ota Tokyo (JP);
Mitsunori Tadokoro, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/799,619

(22) Filed: Aug. 9, 2024

(65) Prior Publication Data

US 2025/0094055 A1 Mar. 20, 2025

(30) Foreign Application Priority Data

Sep. 19, 2023 (JP) ................. 2023-150937

(51) Int. Cl.
*G06F 3/06* (2006.01)
(52) U.S. Cl.
CPC .......... *G06F 3/0613* (2013.01); *G06F 3/0656* (2013.01); *G06F 3/0679* (2013.01)
(58) Field of Classification Search
CPC .... G06F 3/0613; G06F 3/0656; G06F 3/0679; G06F 3/061; G06F 3/0659
See application file for complete search history.

(56) References Cited

U.S. PATENT DOCUMENTS

| | | | |
|---|---|---|---|
| 6,581,111 B1 | 6/2003 | Lakhanpal et al. | |
| 7,506,114 B2 | 3/2009 | Haga et al. | |
| 2022/0083264 A1* | 3/2022 | Kojima | G06F 3/0679 |
| 2022/0253248 A1 | 8/2022 | Yoon et al. | |
| 2022/0261183 A1* | 8/2022 | Horspool | G06F 3/061 |
| 2022/0317931 A1* | 10/2022 | Lee | G06F 3/0604 |
| 2025/0110665 A1* | 4/2025 | Clarke | G06F 3/0604 |

* cited by examiner

*Primary Examiner* — Francisco A Grullon
(74) *Attorney, Agent, or Firm* — Foley & Lardner LLP

(57) ABSTRACT

A controller of a memory system issues a first memory read request for reading first data at a head of data to be read from a first memory die to the first memory die. When remaining data following the first data is included in the data to be read, the controller transfers a first identifier from a first command queue to a second command queue corresponding to a second memory die in which second data at a head of the remaining data is stored. The controller issues a second memory read request for reading the second data from the second memory die to the second memory die in response to transferring the first identifier to the second command queue.

12 Claims, 11 Drawing Sheets

MEMORY SYSTEM

CROSS-REFERENCE TO RELATED APPLICATION

This application is based upon and claims the benefit of priority from Japanese Patent Application No. 2023-150937, filed Sep. 19, 2023, the entire contents of which are incorporated herein by reference.

FIELD

Embodiments described herein relate generally to a memory system.

BACKGROUND

A solid state drive (SSD) including a non-volatile memory and a controller that controls the non-volatile memory is known as a memory system that has been widely used in recent years.

The controller reads data to be read from the non-volatile memory based on a read command received from an external host, and transmits the data to be read to the external host. In a case when the non-volatile memory comprising a plurality of memory dies and a transfer length (e.g., a size of data to be read) designated by a read command is relatively large, the memory die of the non-volatile memory to be read may be distributed to the plurality of memory dies. In this case, a plurality of read operations based on the same read command are executed in parallel for the plurality of memory dies, so that a plurality of data parts of the data to be read are read from the plurality of memory dies in an order unrelated to an order of logical addresses of the data parts.

In addition, there is a case that a host requests an SSD to transfer the data to be read, which is designated by the read command issued by the host, to the host in an order of logical addresses. That is, the data to be read is transferred to the host in the order from a data part corresponding to a head logical address to a data part corresponding to a last logical address. In this case, however, a plurality of data parts read from the plurality of memory dies may include data parts that cannot be transferred to the host immediately after being read. Such data parts may remain in a read buffer of the SSD. If many data parts are remaining in the read buffer, this will lead to a reduction of a capacity of the read buffer which can be available for processing of following read commands. And this causes a decrease in performance of the read process of the memory system.

Therefore, in the memory system such as an SSD, a technique capable of improving the performance of the read process by efficiently using the read buffer is required.

DETAILED DESCRIPTION

Figure 1:
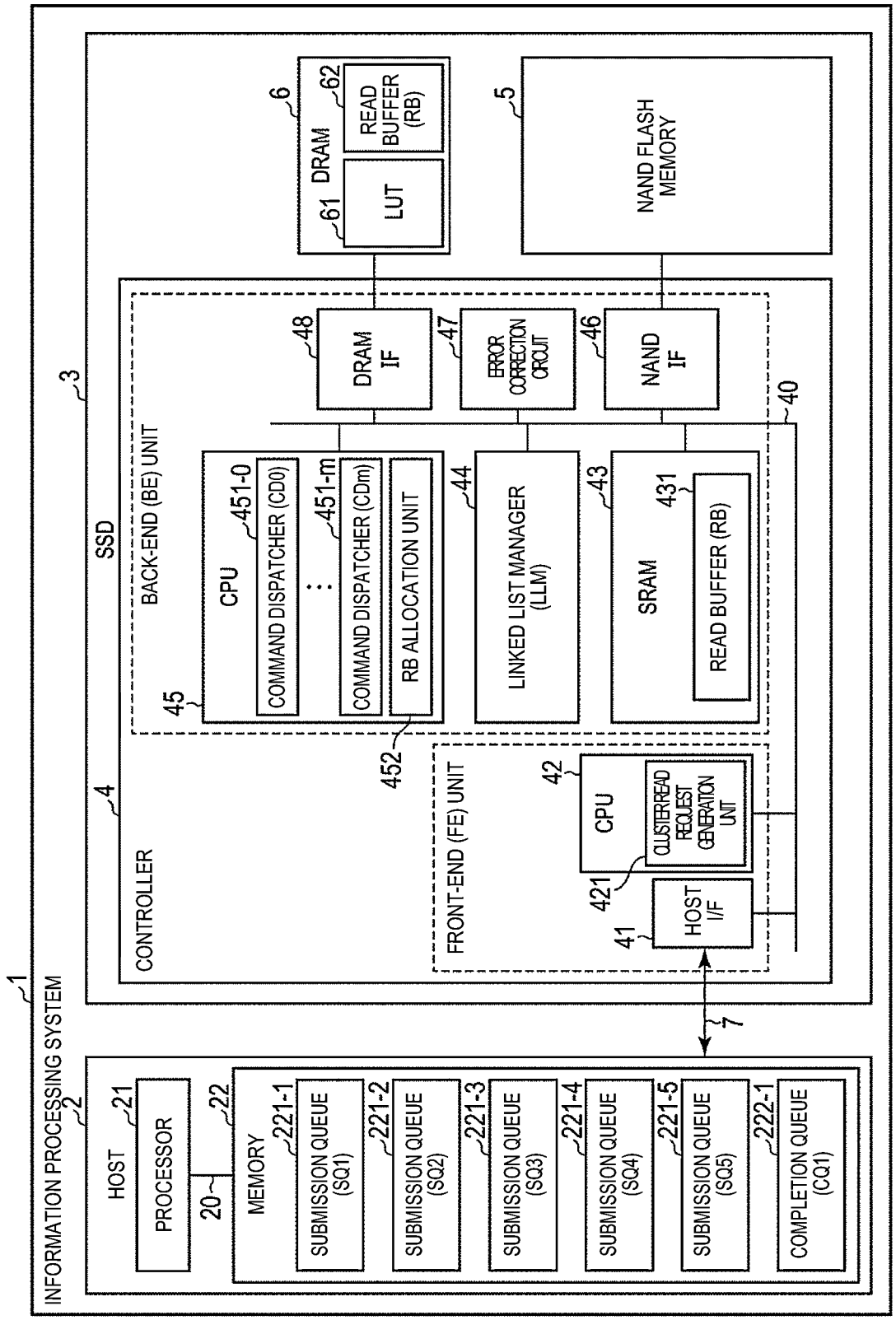
FIG. 1 is a block diagram illustrating a configuration example of an information processing system including a memory system according to an embodiment.

Embodiments provide a memory system capable of improving performance of a read process by efficiently using a read buffer.

In general, according to one embodiment, a memory system is connectable to a host. A memory system includes a non-volatile memory including a plurality of memory dies, and a controller configured to: in response to receiving a first read command requesting a reading of data to be read from the host, divide the data to be read into a plurality of data parts corresponding to a plurality of clusters, and generate a plurality of read requests each including memory address information indicating a storage location of the non-volatile memory in which a corresponding data part of the plurality of data parts is stored; store the plurality of read requests in a first read request queue associated with a first identifier assigned to the first read command such that the plurality of read requests are linked in an order from a read request corresponding to a head cluster of the plurality of clusters to a read request corresponding to a last cluster of the plurality of clusters; store the first identifier in a first command queue corresponding to a first memory die, the first memory die storing a first data part of the plurality of data parts corresponding to the head cluster; in response to storing the first identifier in the first command queue, specify a first storage area of the first memory die, the first storage area storing a first data which is associated with a head of the data to be read and includes at least the first data part of the plurality of data parts, and wherein specifying the first storage area is performed by referring to the plurality of read requests stored in the first read request queue, from the read request corresponding to the head cluster; generate a first memory read request for reading the first data from the first storage area of the first memory die; issue the first memory read request to the first memory die; in response to one or more unprocessed read requests of the plurality of read requests remaining in the first read request queue, transfer the first identifier from the first command queue to a second command queue corresponding to a second memory die, the second memory die storing a second data part of the plurality of data parts, the second data part corresponding to a head cluster of the one or more unprocessed read requests; in response to transferring the first identifier to the second command queue, specify a second storage area of the second memory die, the second storage area storing a second data at a head of remaining data of the data to be read, the second data including at least the second data part of the plurality of data parts, and wherein specifying the second storage area comprises referring to the one or more unprocessed read requests stored in the first read request queue, from an unprocessed read request corresponding to a head cluster of one or more clusters corresponding to the remaining data; generate a second memory read request for reading the second data from the second storage area of the second memory die; and issue the second memory read request to the second memory die.

Hereinafter, an embodiment will be described with reference to drawings.

FIG. 1 is a block diagram illustrating a configuration example of an information processing system 1 including a memory system according to the embodiment. The information processing system 1 includes a host (host device) 2 and a solid state drive (SSD) 3 as the memory system. The host 2 and the SSD 3 are connectable via a bus 7.

The host 2 is an information processing apparatus such as a personal computer, a server computer, or a mobile terminal. The host 2 is connected to the SSD 3 and is accessible to the SSD 3. Specifically, the host 2 transmits a write command for writing data to the SSD 3. The host 2 also transmits a read command for reading data to the SSD 3.

The SSD 3 is also called a storage device, and is capable of writing data to an internal non-volatile memory and of reading data from the internal non-volatile memory.

Communication between the SSD 3 and the host 2 is executed via the bus 7. The bus 7 is a transmission path that connects the host 2 and the SSD 3. The bus 7 is, for example, a Peripheral Component Interconnect Express™ (PCIe™) bus. The PCIe bus is a full duplex transmission path. The full duplex transmission path includes both a transmission path for transmitting data and an input/output (I/O) command from the host 2 to the SSD 3 and a transmission path for transmitting data and a response from the SSD 3 to the host 2. The I/O command is transmitted from the host 2 to the SSD 3, and includes a write command for writing data to the non-volatile memory or a read command for reading data from the non-volatile memory.

For example, the NVM Express™ (NVMe™) standard may be used for a logical interface that connects the host 2 and the SSD 3. In an interface that complies with the NVMe standard, communication is performed between the host 2 and the SSD 3 by using a pair of queues including at least one submission queue (SQ) and a completion queue (CQ) associated with the submission queue (SQ). The pair of queues is referred to as a submission queue/completion queue pair (SQ/CQ pair). In FIG. 1, a case where five submission queues (SQ1 to SQ5) 221-1 to 221-5 and one completion queue (CQ1) 222-1 are used by the host 2 for transmission of each I/O command and reception of a response to each I/O command is shown.

Each of the submission queues (SQ1 to SQ5) 221-1 to 221-5 is a queue used to issue an I/O command to the SSD 3. Each of the submission queues (SQ1 to SQ5) 221-1 to 221-5 includes a plurality of slots. Each of the plurality of slots is capable of storing one I/O command. The host 2 creates the submission queues (SQ1 to SQ5) 221-1 to 221-5 in the memory 22 of the host 2. The host 2 also issues a submission queue create command to the SSD 3. An address indicating a storage location in the memory 22 in which each of the submission queues (SQ1 to SQ5) 221-1 to 221-5 is created, a size of each of the SQ1 to SQ5, an identifier of the completion queue CQ1 associated with each of the SQ1 to SQ5, and the like are notified to the SSD 3 by the submission queue create command.

The completion queue (CQ1) 222-1 is a queue used to receive a completion response indicating a completion of the I/O command from the SSD 3. The completion response includes information indicating a status indicating success or failure of processing of the completed command. The completion response is also referred to as a command completion or a command completion notification. The completion queue (CQ1) 222-1 includes a plurality of slots. Each of the plurality of slots is capable of storing one completion response. The host 2 creates a completion queue (CQ1) 222-1 in the memory 22 of the host 2. Further, the host 2 issues a completion queue create command to the SSD 3. An address indicating a storage location in the memory 22 in which the completion queue (CQ1) 222-1 is created, a size of the CQ1, and the like are notified to the SSD 3 by the completion queue create command.

Next, a configuration of the host 2 will be described.

The host 2 includes a processor 21 and a memory 22, and the processor 21 and the memory 22 are interconnected via an internal bus 20.

The processor 21 is, for example, a central processing unit (CPU). The processor 21 executes software (host software) loaded in the memory 22 from the SSD 3 or another storage device connected to the host 2. The host software includes, for example, an operating system, a file system, and an application program.

The memory 22 is, for example, a volatile memory. The memory 22 is also referred to as a main memory, a system memory, or a host memory. The memory 22 is, for example, a dynamic random access memory (DRAM). A part of the storage area of the memory 22 is used to store the SQ/CQ pair. In addition, another part of the storage area of the memory 22 is used as a data buffer. The data buffer stores write data to be written to the SSD 3 or read data transferred from the SSD 3.

In communication between the host 2 and the SSD 3, the SQ/CQ pair is used to issue the I/O command from the host 2 to the SSD 3 and to transmit the completion response from the SSD 3 to the host 2. The transfer of the I/O command, the data, and the completion response between the host 2 and the SSD 3 is executed via the bus 7.

In addition, in the communication between the host 2 and the SSD 3, another SQ/CQ pair (not illustrated) for an administrative command (admin command) is used to issue an administrative command from the host 2 to the SSD 3 and to transmit a completion response from the SSD 3 to the host 2. The transfer of the administrative command and the completion response between the host 2 and the SSD 3 is also executed via the bus 7. The administrative command is a command for managing the SSD 3. The administrative command includes, for example, a completion queue create command, a submission queue create command, various other commands related to setting and management of SSD 3, and the like.

Next, an internal configuration of the SSD 3 will be described. The SSD 3 includes a controller 4 and a non-volatile memory 5. An example of the non-volatile memory 5 is, for example, a NAND flash memory. Hereinafter, it is assumed that the non-volatile memory 5 is implemented as a NAND flash memory. Hereinafter, the non-volatile memory 5 will be referred to as a NAND flash memory 5. The NAND flash memory 5 may be a flash memory having a two-dimensional structure or a flash memory having a three-dimensional structure. In addition, the SSD 3 may further include a random access memory, for example, a dynamic random access memory (DRAM) 6.

The controller 4 is a memory controller. The controller 4 is, for example, a control circuit such as a system-on-a-chip (SoC). The controller 4 is electrically connected to each of the NAND flash memory 5 and the DRAM 6. The controller 4 processes each I/O command received from the host 2. The controller 4 executes a process of writing data to the NAND flash memory 5 when a write command is received. The controller 4 executes a process of reading data from the NAND flash memory 5 when a read command is received. For example, a Toggle NAND flash interface or an open NAND flash interface (ONFI) is used as a physical interface for connecting the controller 4 and the NAND flash memory 5. The functions of each part of the controller 4 may be implemented by dedicated hardware, a processor that executes a program, or a combination thereof.

The NAND flash memory 5 is a non-volatile memory. The NAND flash memory 5 includes, for example, a plurality of memory dies. The memory die is also referred to as a memory chip. Each of the plurality of memory dies is implemented as a NAND flash memory die. Hereinafter, the memory die is also referred to as a flash die or simply a die.

The DRAM 6 is a volatile memory. The DRAM 6 includes, for example, a storage area for storing a look-up table (LUT) 61 and a storage area used as a read buffer 62.

The LUT 61 is a logical-to-physical address translation table that stores mapping information. The mapping information is information indicating mapping between each of the logical addresses and each of the physical addresses of the NAND flash memory 5 in units of clusters. The logical address is an address in a logical address space of the SSD 3. For example, a logical cluster address (LCA) or a logical block address (LBA) is used as the logical address. The LCA is an address indicating a location in the logical address space of the SSD 3 in units of clusters. The LBA is an address used by the host 2 to access the SSD 3. The physical address is memory address information indicating a storage location in the NAND flash memory 5. For example, a media cluster address (MCA) is used as the physical address. The MCA is a memory address indicating individual storage locations in the NAND flash memory 5 in units of clusters. A size of data corresponding to one cluster is, for example, 4 KiB. A size of data associated with one LBA is, for example, 512 B or 4 KiB.

When a size of data associated with one LBA is 512 B and a size of data corresponding to one cluster is 4 KiB, the controller 4 converts the LBA into the LCA and manages a correspondence relationship between the LCA and the MCA by using the mapping information.

When a size of data associated with one LBA is 4 KiB and a size of data corresponding to one cluster is 4 KiB, the LBA matches the LCA. Therefore, in this case, the controller 4 manages the correspondence relationship between the LBA (=LCA) and the MCA without converting the LBA into the LCA by using the mapping information.

The read buffer 62 is a storage area used to temporarily store read data read from the NAND flash memory 5. In addition, the other storage area of the DRAM 6 is used by the controller 4 as a write buffer for temporarily storing data to be written to the NAND flash memory 5, for example.

Next, an internal configuration of the controller 4 will be described. The controller 4 includes, for example, elements such as a host interface (host I/F) 41, a CPU 42, a static RAM (SRAM) 43, a linked list manager (LLM) 44, a CPU 45, a NAND interface (NAND I/F) 46, an error correction circuit 47, and a DRAM interface (DRAM I/F) 48. The elements are connected to each other via an internal bus 40.

Among the elements of the controller 4, an element that controls communication with the host 2 is referred to as a front-end (FE) unit. The front-end unit includes a host interface 41 and a CPU 42. For example, the front-end unit interprets various commands received from the host 2.

The host interface 41 is a communication interface circuit that communicates with the host 2. The host interface 41 is implemented by, for example, a PCIe controller. For example, the host interface 41 includes an arbitration mechanism. The arbitration mechanism is a mechanism that selects a submission queue, from which an I/O command is to be fetched, from the submission queues (SQ1 to SQ5) 221-1 to 221-5 of the host 2. The arbitration mechanism is, for example, a round robin arbitration mechanism or a weighted round robin arbitration mechanism.

The CPU 42 is a processor that controls processing in the front-end unit. The CPU 42 loads a control program (firmware) stored in the NAND flash memory 5 or a ROM (not illustrated) into the SRAM 43. The CPU 42 performs various processes by executing the firmware. The firmware may be loaded into the DRAM 6.

The CPU 42 includes a cluster read request generation unit 421. The cluster read request generation unit 421 may be implemented by dedicated hardware in the controller 4 (for example, a front-end unit).

The cluster read request generation unit 421 divides data to be read into a plurality of data parts corresponding to a plurality of clusters, and generates a plurality of read requests, each of which includes memory address information (MCA) indicating a storage location of the NAND flash memory 5 in which a corresponding data part is stored, in response to receiving a read command for requesting reading of the data to be read from the host 2. The details of the cluster read request generation unit 421 will be described later with reference to FIG. 4.

Among the elements of the controller 4, an element that controls the NAND flash memory 5 is referred to as a back-end (BE) unit. The back-end unit includes an SRAM 43, a linked list manager 44, a CPU 45, a NAND interface 46, an error correction circuit 47, and a DRAM interface 48. For example, the back-end unit instructs the NAND flash memory 5 to write data or to read data.

The SRAM 43 is a volatile memory. A storage area of the SRAM 43 is used as, for example, a read buffer (RB) 431. The read buffer (RB) 431 is a storage area in which data read from the NAND flash memory 5 is temporarily stored. When data is read from the NAND flash memory 5 in a state where there is no sufficient available area in the SRAM 43, the data read from the NAND flash memory 5 is temporarily stored in the read buffer 62 of the DRAM 6. In addition, another storage area of the SRAM 43 may be used as a write buffer for temporarily storing data to be written to the NAND flash memory 5.

The linked list manager 44 is a circuit that manages the cluster read requests for each command context ID (CCID). The CCID is an identifier for uniquely identifying a read command received from the host 2. The CCID is assigned to each of the received read commands by the controller 4 (more specifically, the front-end unit). The linked list manager 44 stores a plurality of cluster read requests including the same CCID, that is, a plurality of cluster read requests generated from one read command in a read request queue associated with the CCID. Hereinafter, the read request queue is also referred to as a CCID queue. Details of the linked list manager 44 will be described later with reference to FIGS. 5 to 7. The function of the linked list manager 44 may be implemented by the CPU 45.

The CPU 45 is a processor that controls processing in a back-end unit of the controller 4. The CPU 45 performs, for example, management of data stored in the NAND flash memory 5 and management of blocks provided in the NAND flash memory 5 as a flash translation layer (FTL). The management of the data stored in the NAND flash memory includes, for example, management of the mapping information. The CPU 45 uses the LUT 61 to manage the mapping information. In addition, the management of the block provided in the NAND flash memory 5 includes management of defective blocks provided in the NAND flash memory 5, wear leveling, and garbage collection (that is, compaction).

The CPU 45 includes command dispatchers (CD0 to CDm) 451-0 to **451-*m* and a read buffer (RB) allocation unit 452. That is, the command dispatchers (CD0 to CDm) 451-0 to 451-*m* and the read buffer (RB) allocation unit 452 are implemented by firmware executed by the CPU 45. The command dispatchers (CD0 to CDm) 451-0 to 451-*m* and the read buffer (RB) allocation unit 452 may be implemented by dedicated hardware in the controller 4**.

Each of the command dispatchers (CD0 to CDm) 451-0 to **451-*m* generates a memory read request for one or more flash dies set in advance, and issues the generated memory read request to the one or more flash dies via the NAND interface (NAND I/F) 46. Details of the command dispatchers (CD0 to CDm) 451-0 to 451-*m* will be described later with reference to FIGS. 5 and 7**.

When an available storage area having a size equal to or larger than the first size exists in the SRAM 43, the read buffer (RB) allocation unit 452 allocates the storage area of the SRAM 43 as a read buffer (RB) for temporarily storing the data read from the NAND flash memory 5. When the available storage area having the size equal to or larger than the first size does not exist in the SRAM 43, the read buffer allocation unit 452 allocates the storage area of the DRAM 6 as the read buffer. Writing and reading data to and from the SRAM 43 can be executed at a higher speed than writing and reading data to and from the DRAM 6. Therefore, the performance of the read process of the SSD 3 can be improved by using the storage area of the SRAM 43 as the read buffer.

The NAND interface 46 is a circuit that controls the NAND flash memory 5. The NAND interface 46 is electrically connected to a plurality of flash dies provided in the NAND flash memory 5.

The error correction circuit 47 executes an encoding process when data is written to the NAND flash memory 5. In the encoding process, the error correction circuit 47 adds an error correction code (ECC) to data to be written to the NAND flash memory 5 as a redundant code. When data is read from the NAND flash memory 5, the error correction circuit 47 executes a decode process. In the decode process, the error correction circuit 47 executes error correction of the data by using the ECC added to the data read from the NAND flash memory 5.

The DRAM interface 48 is a circuit that controls the DRAM 6. The DRAM interface 48 stores data in the DRAM 6. In addition, the DRAM interface 48 reads data stored in the DRAM 6.

Figure 2:
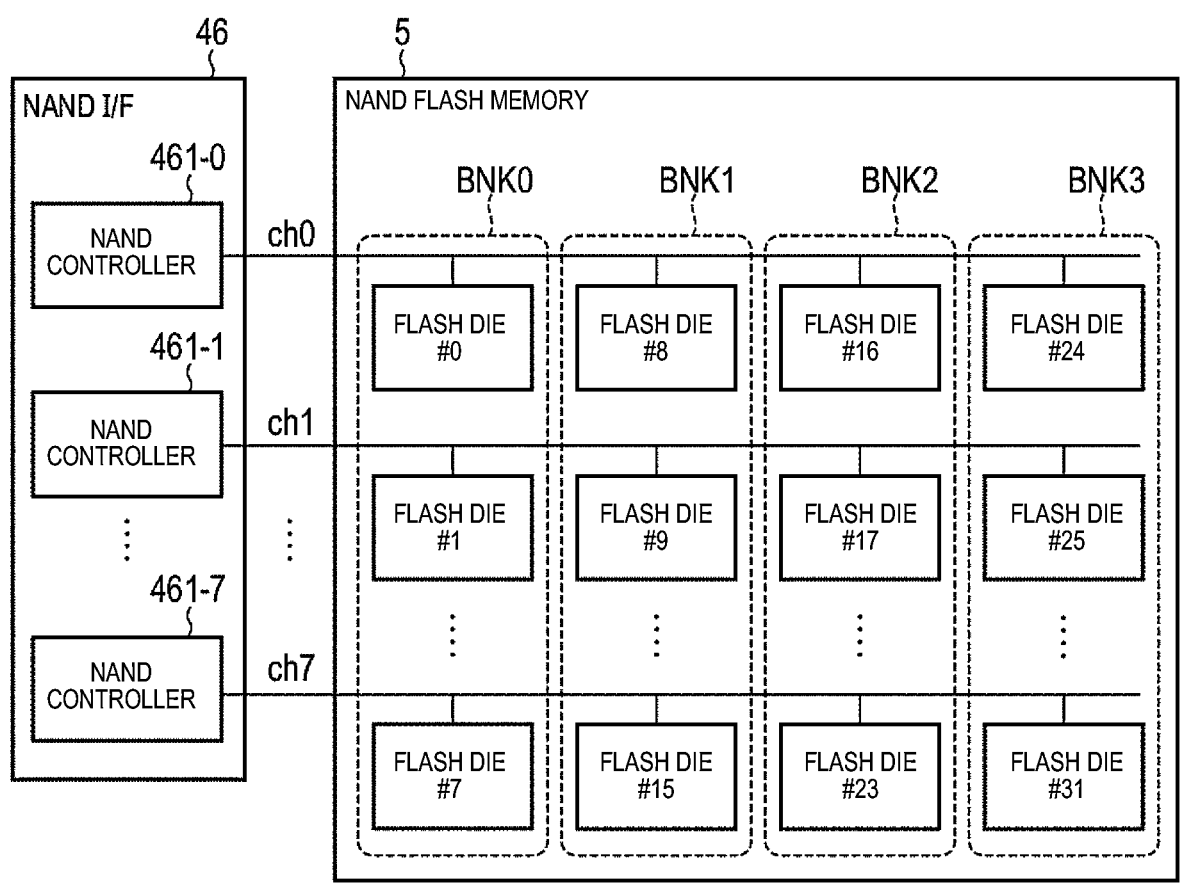
FIG. 2 is a block diagram illustrating a configuration example of a non-volatile memory of the memory system according to the embodiment.

Next, an example of an internal configuration of the NAND flash memory 5 will be described. FIG. 2 is a block diagram illustrating a configuration example of a non-volatile memory (for example, a NAND flash memory) of the memory system according to the embodiment.

FIG. 2 shows an example in which the NAND flash memory 5 includes 32 flash dies #0 to #31. Each flash die is independently operable. Therefore, the flash die functions as a unit capable of parallel operation. The NAND interface 46 includes, for example, NAND controllers 461-0, 461-1, . . . , and 461-7. The NAND controllers 461-0, 461-1, . . . , and 461-7 are connected to channels ch0, ch1, . . . , and ch7, respectively. Each of the NAND controllers 461-0, 461-1, . . . , and 461-7 is connected to one or a plurality of flash dies via a corresponding channel. FIG. 2 illustrates a case where four flash dies are connected to each of the channels ch0, ch1, . . . , and ch7. In this case, the NAND controller 461-0 is connected to the flash dies #0, #8, #16, and #24 via the channel ch0. The NAND controller 461-1 is connected to the flash dies #1, #9, #17, and #25 via the channel ch1. The NAND controller 461-7 is connected to the flash dies #7, #15, #23, and #31 via the channel ch7. The flash dies #0, #1, . . . , and #7 are treated as the bank BNK0 by the controller 4. The flash dies #8, #9, . . . , and #15 are treated as the bank BNK1 by the controller 4. The flash dies #16, #17, . . . , and #23 are treated as the bank BNK2 by the controller 4. Similarly, the flash dies #24, #25, . . . , and #31 are treated as the bank BNK3 by the controller 4. The bank is a unit in which a plurality of flash dies are operated in parallel by an interleaving operation.

In the configuration of the NAND flash memory 5 shown in FIG. 2, the controller 4 is accessible to the flash dies #0 to #31 in parallel by using 8 channels and a bank interleaving operation. Therefore, the controller 4 is capable of executing writing or reading of data for a maximum of 32 flash dies in parallel (the number of parallel accesses=32). Each of the flash dies #0 to #31 may have a multi-plane configuration having a plurality of planes. For example, when each of the flash dies #0 to #31 includes four planes, the controller 4 is capable of executing writing or reading of data for a maximum of 128 planes in parallel (the number of parallel accesses=128).

Figure 3:
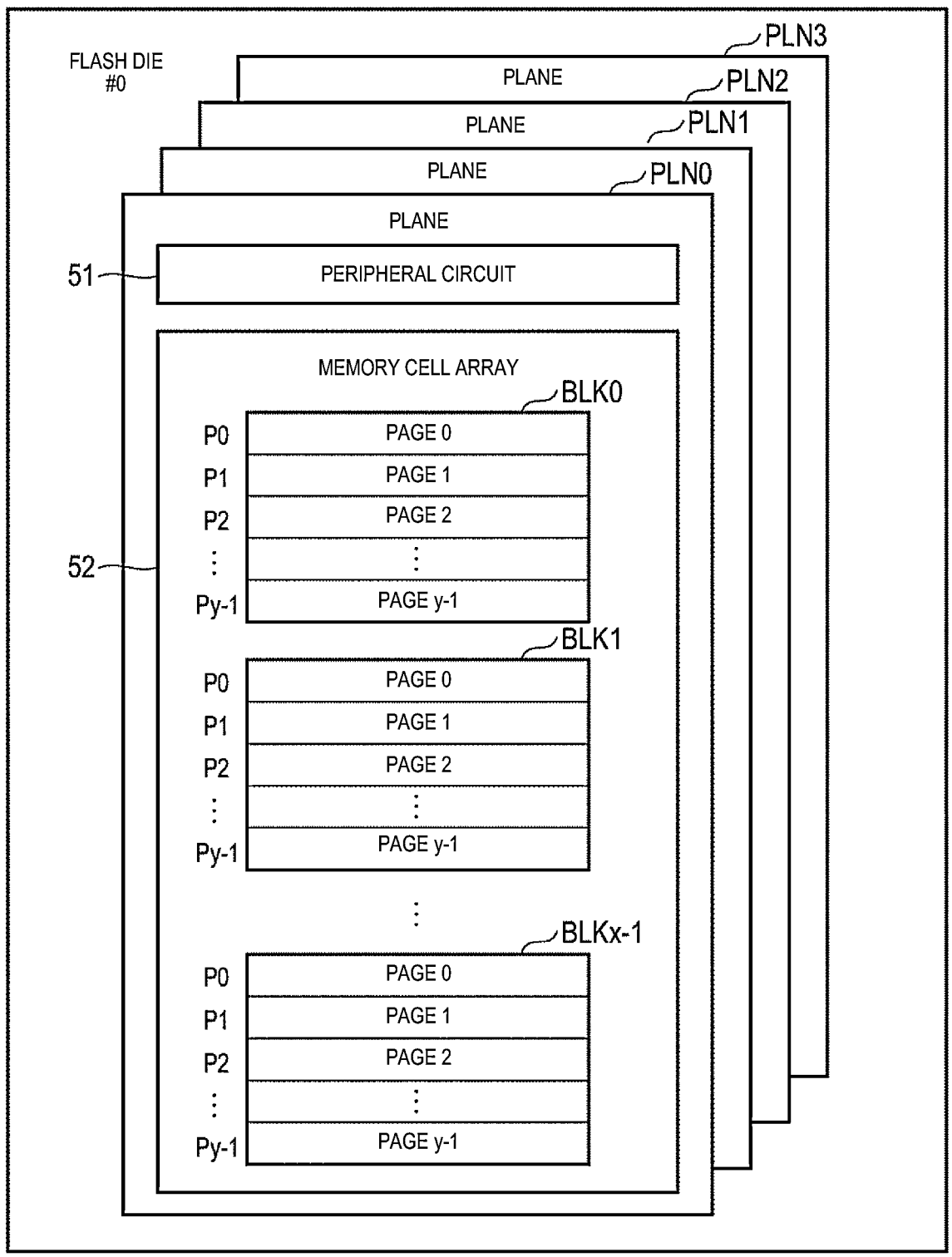
FIG. 3 is a block diagram illustrating a configuration example of each of a plurality of memory dies provided in the non-volatile memory of the memory system according to the embodiment.

Next, an internal configuration of the flash die will be described. FIG. 3 is a block diagram illustrating a configuration example of each of the plurality of memory dies (flash dies) provided in the non-volatile memory (for example, the NAND flash memory 5) of the memory system according to the embodiment. In FIG. 3, the configuration of the flash die is described with the flash die #0 in focus. The other flash dies provided in the NAND flash memory 5 also have the same configuration as the flash die #0. The flash die #0 includes, for example, a plurality of planes (here, four planes PLN0, . . . , and PLN3). Each of the planes PLN0 to PLN3 includes a peripheral circuit 51 and a memory cell array 52.

The peripheral circuit 51 is a circuit that controls the memory cell array 52. The peripheral circuit 51 includes, for example, a row decoder, a column decoder, a sense amplifier, a page buffer, and the like. The peripheral circuit 51 executes a data write operation, a data read operation, or a data erasing operation on the memory cell array.

The memory cell array 52 includes a plurality of blocks (BLK0, BLK1, . . . , and BLKx-1). Each block BLK is a minimum unit of a data erasing operation. Each of the plurality of blocks includes a plurality of pages (P0, P1, . . . and Py-1). Each page P is a unit of a data write operation and a data read operation. The page includes a set of memory cells connected to the same word line. The page is also referred to as a physical page.

Figure 4:
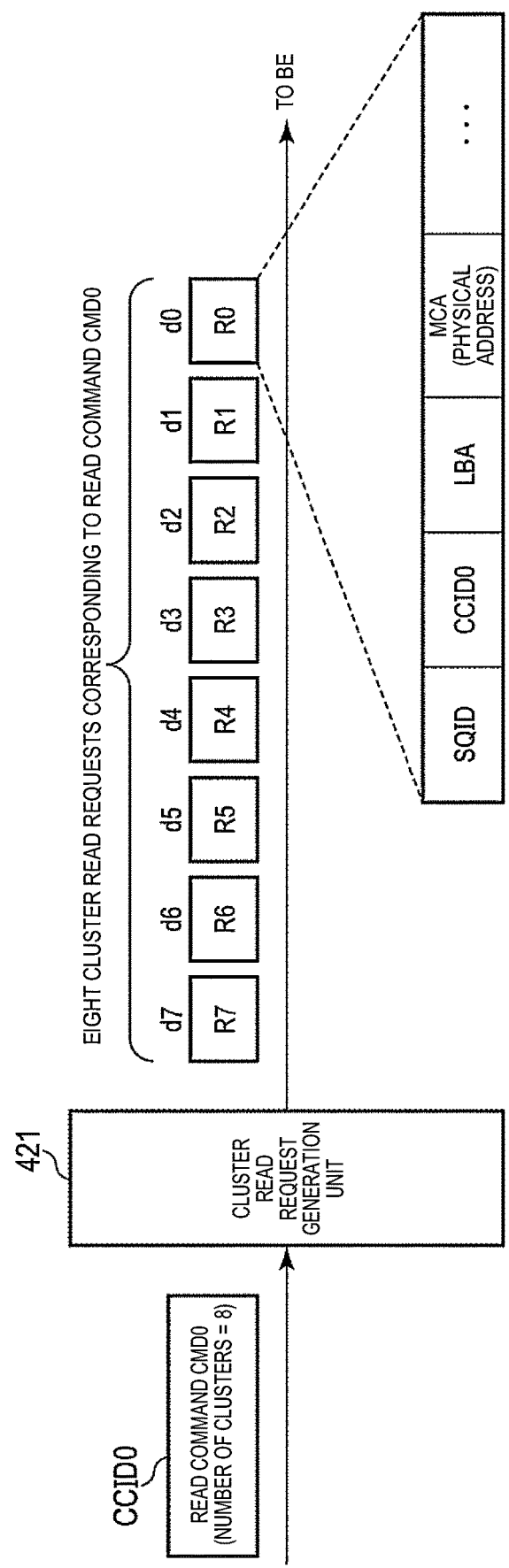
FIG. 4 is a diagram illustrating processing executed in a cluster read request generation unit of a memory system according to the embodiment.

Next, a cluster read request generation process will be described. FIG. 4 is a diagram illustrating processing executed in the cluster read request generation unit 421 of the SSD 3 according to the embodiment. Here, it is assumed that the controller 4 receives a read command CMD0 from the host 2.

The read command CMD0 is a command for requesting reading of data to be read. The read command CMD0 designates, for example, a start logical address (start LBA) corresponding to the data to be read, a transfer length indicating a size of the data to be read, a memory address (data pointer) indicating a location on the memory 22 to which the data to be read is to be transferred, and the like.

When receiving the read command CMD0, the controller 4 (more specifically, the host interface 41) assigns a CCID (for example, CCID0) to the read command CMD0.

Here, it is assumed that the data to be read is data having a size corresponding to eight clusters. In this case, the start LBA designated by the read command CMD0 indicates the LBA corresponding to the head cluster of the data to be read of eight clusters, and the transfer length designated by the read command indicates a length of eight clusters.

The cluster read request generation unit 421 of the controller 4 generates one or more cluster read requests based on the received read command CMD0. Since the data to be read associated with the read command CMD0 has a size corresponding to eight clusters, the cluster read request generation unit 421 divides the data to be read into eight data parts corresponding to the eight clusters, and generates eight cluster read requests R0 to R7 corresponding to the head cluster to the last cluster of the eight clusters, respectively.

The cluster read request R0 is a read request for reading a data part d0 of 4 KiB corresponding to the head cluster of the eight clusters from the NAND flash memory 5. The cluster read request R1 is a read request for reading a data part d1 of 4 KiB corresponding to a second cluster of the eight clusters from the NAND flash memory 5. The cluster read request R2 is a read request for reading a data part d2 of 4 KiB corresponding to a third cluster of the eight clusters from the NAND flash memory 5. The cluster read request R3 is a read request for reading a data part d3 of 4 KiB corresponding to a fourth cluster of the eight clusters from the NAND flash memory 5. The cluster read request R4 is a read request for reading a data part d4 of 4 KiB corresponding to a fifth cluster of the eight clusters from the NAND flash memory 5. The cluster read request R5 is a read request for reading a data part d5 of 4 KiB corresponding to a sixth cluster of the eight clusters from the NAND flash memory 5. The cluster read request R6 is a read request for reading a data part d6 of 4 KiB corresponding to a seventh cluster of the eight clusters from the NAND flash memory 5. The cluster read request R7 is a read request for reading a data part d7 of 4 KiB corresponding to the last cluster of the eight clusters from the NAND flash memory 5.

Each of the cluster read requests R0 to R7 includes an SQID, a CCID0, an LBA, an MCA, and the like.

The SQID is an identifier of the submission queue SQ from which the read command CMD0 is fetched. For example, when the read command CMD0 is fetched from the submission queue SQ1 by the host interface 41, each of the cluster read requests R0 to R7 includes the SQID1. The SQID1 is an identifier of the submission queue SQ1.

The CCID0 is an identifier assigned to the read command CMD0 as described above. Since the cluster read requests R0 to R7 belong to the read command CMD0, each of the cluster read requests R0 to R7 includes the CCID0.

The LBA is an LBA corresponding to a data part of one cluster requested to be read by each cluster read request. For example, the LBA included in the cluster read request R0 is an LBA corresponding to the data part d0 corresponding to the head cluster of eight clusters corresponding to the data to be read (that is, the start LBA designated by the read command CMD0). When a size of data corresponding to one LBA is 4 KiB, the LBA included in the cluster read request R1 is the start LBA+1, and the LBA included in the cluster read request R7 is the start LBA+7.

The MCA is memory address information indicating a storage location of the NAND flash memory 5 in which a data part of one cluster that is requested to be read by each cluster read request is stored. The MCA included in each cluster read request is acquired from the LUT61 by referring to the LUT61 using the LBA included in each cluster read request. The process of acquiring the MCA from LUT61 may be executed by the cluster read request generation unit 421, or may be executed by another module located, for example, between the front-end unit and the back-end unit in the controller 4.

To increase the parallelism of the write operation, the controller 4 executes the sequential write across the plurality of flash dies, for example, in units of page sizes. For example, when the page size is 16 KiB, the sequential write of data of 32 KiB is executed across two flash dies, for example, in units of four clusters. Therefore, when the transfer length designated by the read command is relatively large, it is necessary to read the data to be read from the plurality of flash dies.

Here, it is assumed that the data parts d0 to d3 are stored in four storage locations in a first page of a first flash die, and the data parts d4 to d7 are stored in four storage locations in a second page of a second flash die.

The MCA included in the cluster read request R0 indicates a first storage location in the first page of the first flash die, the MCA included in the cluster read request R1 indicates a second storage location in the first page of the first flash die, the MCA included in the cluster read request R2 indicates a third storage location in the first page of the first flash die, and the MCA included in the cluster read request R3 indicates a fourth storage location in the first page of the first flash die.

The MCA included in the cluster read request R4 indicates a first storage location in the second page of the second flash die, the MCA included in the cluster read request R5 indicates a second storage location in the second page of the second flash die, the MCA included in the cluster read request R6 indicates a third storage location in the second page of the second flash die, and the MCA included in the cluster read request R7 indicates a fourth storage location in the second page of the second flash die.

The eight cluster read requests R0 to R7 generated by the cluster read request generation unit 421 are transmitted to the back-end unit of the controller 4 in the order of R0 to R7. The back-end unit instructs the NAND flash memory 5 to execute a data read operation based on the received eight cluster read requests R0 to R7. As a result, the eight data parts d0 to d7 are read from the NAND flash memory 5. The controller 4 transfers (transmits) the read eight data parts d0 to d7 to the host 2 in LBA order, that is, in the order of the data parts d0, d1, . . . , and d7. Thereby, the processing of the read command CMD0 is completed.

Figure 5:
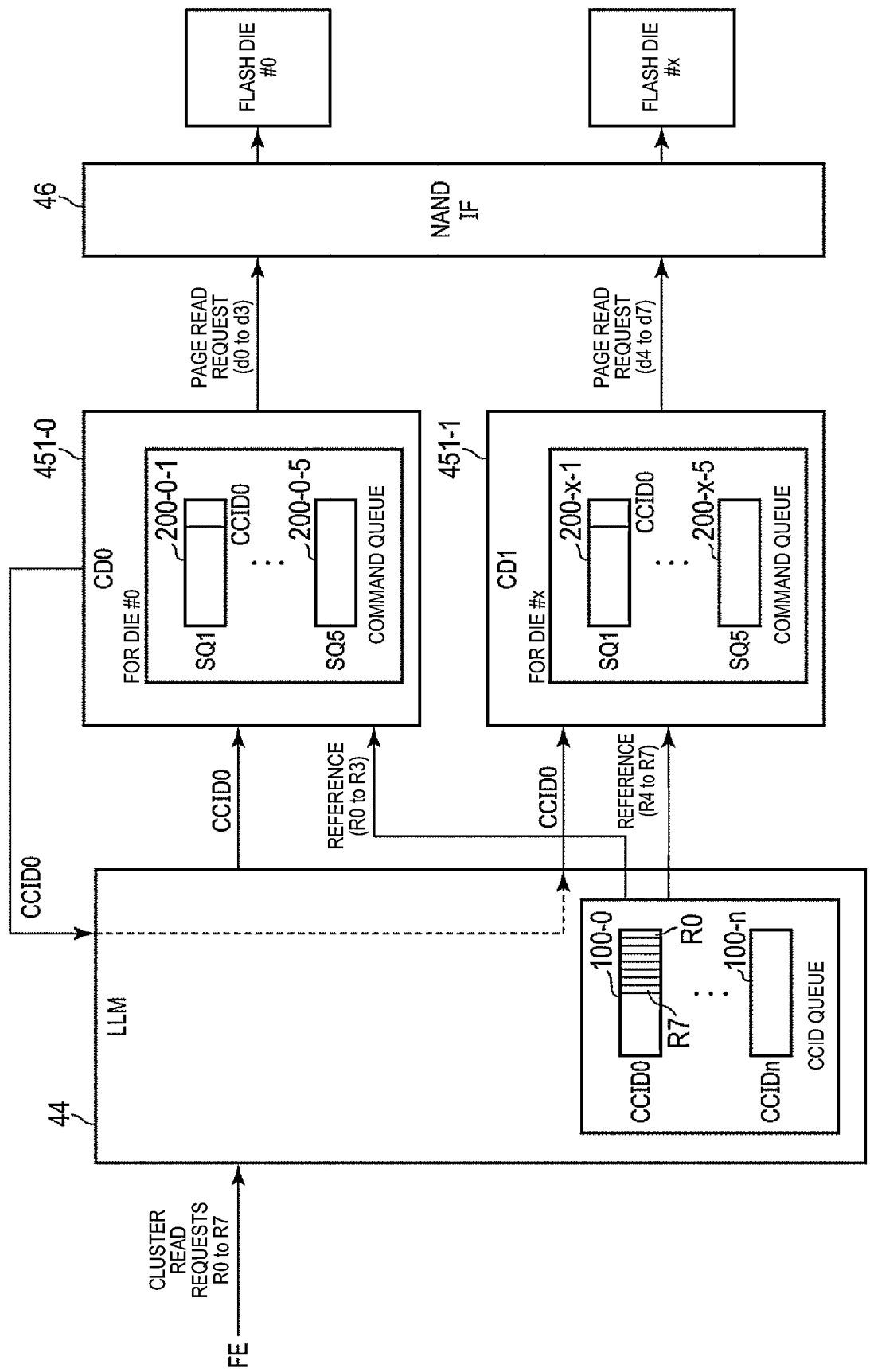
FIG. 5 is a block diagram illustrating an outline of a configuration example of a linked list manager and a command dispatcher of the memory system according to the embodiment.

Next, the read process executed in the back-end unit of the controller 4 will be described. FIG. 5 is a block diagram illustrating an outline of a configuration example of the linked list manager (LLM) 44 of the SSD 3 and each command dispatcher (here, a command dispatcher (CD0) 451-0 and a command dispatcher (CD1) 451-1).

The linked list manager (LLM) 44 includes a plurality of CCID queues 100-0 to 100-n. The CCID queues 100-0 to 100-n may be implemented by the latch circuits in the linked list manager (LLM) 44, or may be stored in the SRAM 43. Each of the CCID queues 100-0 to 100-n is a queue used to store a cluster read request associated with a certain CCID. Each CCID queue is also referred to as a read request queue. The CCID queue 100-0 is associated with the CCID0. In addition, the CCID queue 100-n is associated with the CCIDn. The linked list manager (LLM) 44 stores each cluster read request including the CCID0 in the CCID queue 100-0, and stores each cluster read request including the CCIDn in the CCID queue 100-n. The number of the plurality of CCID queues 100-0 to 100-n may correspond to a queue depth (QD). The queue depth is the number of commands issued at once from the host 2 to the SSD 3.

Here, it is assumed that the command dispatcher (CD0) 451-0 is in charge of the read process for the flash die #0 and the command dispatcher (CD1) 451-1 is in charge of the read process for the flash die #x.

In this case, the command dispatcher (CD0) 451-0 includes one or more command queues corresponding to the flash die #0. In FIG. 5, a case where the command dispatcher (CD0) 451-0 includes the command queues 200-0-1 to 200-0-5 corresponding to the submission queues SQ1 to SQ5, respectively, is shown as an example.

The command dispatcher (CD1) 451-1 includes one or more command queues corresponding to the flash die #x. In FIG. 5, a case where the command dispatcher (CD1) 451-1 includes the command queues 200-x-1 to 200-x-5 corresponding to the submission queues SQ1 to SQ5, respectively, is shown as an example.

The command queues 200-0-1 to 200-0-5 and the command queues 200-x-1 to 200-x-5 may be stored in the SRAM 43.

Next, an operation executed by the linked list manager (LLM) 44 and each command dispatcher will be described.

Before describing the operation of the linked list manager (LLM) 44 and each command dispatcher, an outline of the read process executed by the controller 4 will be described.

The controller 4 generates a plurality of cluster read requests by making the data to be read into a plurality of data parts corresponding to the plurality of clusters in response to receiving the read command from the host 2. For example, when the read command CMD0 in FIG. 4 is received, the cluster read requests R0 to R7 are generated.

The controller 4 stores a plurality of the cluster read requests R0 to R7, from the cluster read request RC corresponding to the head cluster of the plurality of clusters to the cluster read request R7 corresponding to the last cluster of the plurality of clusters, in the CCID queue 100-0 associated with the CCID0 assigned to the read command CMD0 such that the cluster read requests R0 to R7 are linked in this order. For example, the linked list manager 44 manages the cluster read requests R0 to R7 stored in the CCID queue 100-0 using a linked list. Details of a data structure of the linked list will be described later with reference to FIG. 6. Hereinafter, the head cluster of the plurality of clusters corresponding to the data to be read is also referred to as a head cluster of the data to be read, and the last cluster of the plurality of clusters is also referred to as a last cluster of the data to be read.

The controller 4 stores the CCID0 in a command queue corresponding to a flash die in which the data part d0 corresponding to the head cluster of the data to be read is stored. In this case, the controller 4 is capable of specifying the flash die in which the data part d0 is stored, based on the MCA included in the cluster read request R0. For example, when the flash die in which the data part d0 is stored is the flash die #0 and the SQID included in the cluster read request R0 is SQID1, the controller 4 stores the CCID0 in the command queue 200-0-1 of the command dispatcher (CD0) 451-1.

In response to storing the CCID0 in the command queue 200-0-1, the controller 4 specifies a first storage area of the flash die #0 in which the first data (data parts d0 to d3) at the head of the data to be read, which includes at least the data part d0, is stored by referring to the cluster read requests R0 to R7 stored in the CCID queue 100-0 from the cluster read request R0 at the head of the data to be read. The controller 4 generates the memory read request (page read request) for reading the first data (data parts d0 to d3) at the head of the data to be read from the first storage area of the flash die #0. The controller 4 issues the generated page read request to the flash die #0 via the NAND interface 46.

In the process of specifying the storage area, the controller 4 specifies each of the four storage locations of the flash die #0 in which the data parts d0 to d3 are stored, based on the MCA included in the cluster read requests R0 to R3. The controller 4 generates a page read request for reading first data (data parts d0 to d3) from the page (first storage area) including the four storage locations, based on the specified four storage locations.

Here, the unprocessed cluster read requests R4 to R7 remain in the CCID queue 100-0. In other words, the remaining data following the first data (data parts d0 to d3) is included in the data to be read. In this case, the controller 4 transfers the CCID0 from the command queue 200-0-1 to the command queue corresponding to the flash die in which the second data part d4 corresponding to the head cluster of one or more clusters (here, four clusters) corresponding to the remaining data is stored.

The controller 4 can specify the flash die in which the second data part d4 is stored, based on the MCA included in the head cluster read request R4 among the unprocessed cluster read requests R4 to R7. For example, when the flash die in which the second data part d4 is stored is the flash die #x, the controller 4 transfers the CCID0 from the command queue 200-0-1 to the command queue 200-x-1 of the command dispatcher (CD1) 451-2.

The transfer of the CCID0 from the command queue 200-0-1 to the command queue 200-x-1 is executed via the linked list manager 44. That is, the command dispatcher (CD0) 451-0 returns the CCID0 to the linked list manager 44. The linked list manager 44 transmits the returned CCID0 to the command dispatcher (CD1) 451-1. As a result, the CCID0 is stored in the command queue 200-x-1.

In response to transferring the CCID0 to the command queue 200-x-1, the controller 4 specifies the second storage area of the flash die #x in which the second data (here, data parts d4 to d5) at the head of the remaining data, which includes at least the second data part d4, is stored, by referring to the unprocessed cluster read requests (R4 to R5) stored in the CCID queue 100-0 from the cluster read request (R4) corresponding to the head cluster of one or more clusters (here, four clusters) corresponding to the remaining data. The controller 4 generates a memory read request (page read request) for reading the second data (data parts d4 to d5) from the second storage area of the flash die #x. The controller 4 issues the generated page read request to the flash die #x via the NAND interface 46.

In this case, the controller 4 specifies each of the four storage locations of the flash die #x in which the data d4 to d5 are stored, based on the MCA included in the cluster read request R4 to R7. The controller 4 generates a page read request for reading data from the page including the four storage locations, based on the specified four storage locations.

By the above processing, after the page read request for reading the data d0 to d3 from the flash die #0 is generated, it is possible to generate the page read request for reading the data d4 to d7 from the flash die #x. Therefore, it is possible to read the first data (d0, d1, d2, d3) at the head of the data to be read from the flash die #0 in the order of d0 to d3, and thereafter, it is possible to read the second data (d4, d5, d6, d7) following the first data from the flash die #x in the order of d4 to d7.

When the cluster read requests R0 to R7 are simultaneously distributed to the command queue corresponding to the flash die #0 and the command queue corresponding to the flash die #x, the second data, which cannot be transferred to the host 2 immediately after being read, remains in the read buffer 431 of the SRAM 43 for a long time. This is because a process of transferring the second data to the host 2 cannot be started until a process of transferring the first data to the host 2 is completed.

In the present embodiment, it is possible to read the second data from the flash die #x after reading the first data from the flash die #0. Therefore, it is possible to start the process of transferring the first data to the host 2 immediately after the first data is read from the flash die #0, and it is possible to start the process of transferring the second data to the host 2 immediately after the second data is read from the flash die #x. Further, while the first data is being read from the flash die #0, it is possible to use the flash die #x for a data read operation associated with another read command. Therefore, it is possible to efficiently use the read buffer 431 of the SRAM 43 as compared to a case where the cluster read requests R0 to R7 are simultaneously distributed to the command queue corresponding to the flash die #0 and the command queue corresponding to the flash die #x, and thus the performance of the read process can be improved.

Next, an operation of the linked list manager (LLM) 44 and each command dispatcher will be described.

Here, a case where the eight cluster read requests R0 to R7 generated by the cluster read request generation unit 421 in FIG. 4 are transmitted to the back-end unit will be described.

The linked list manager 44 of the controller 4 receives the cluster read requests R0 to R7 from the front-end (FE) unit (for example, the cluster read request generation unit 421).

The linked list manager 44 selects a CCID queue by referring to the CCID included in the received cluster read requests R0 to R7. Here, the linked list manager 44 selects the CCID queue 100-0 correlated with the CCID0 included in the received cluster read requests R0 to R7.

The linked list manager 44 stores the received cluster read requests R0 to R7 in the selected CCID queue 100-0. The linked list manager 44 stores the cluster read requests R0 to R7 in the CCID queue 100-0 such that the cluster read requests R0 to R7 are linked in the same order as the received order.

The linked list manager 44 determines which flash die includes the storage location in which the data part d0 associated with the cluster read request R0 stored in the CCID queue 100-0 is stored. Specifically, the linked list manager 44 refers to the MCA included in the cluster read request R0. The linked list manager 44 determines that the storage location indicated by the MCA of the cluster read request R0 is included in the flash die #0.

The linked list manager 44 transmits the CCID0 to the command dispatcher (CD0) 451-0 corresponding to the flash die #0. The command dispatcher (CD0) 451-0 includes five command queues 200-0-1 to 200-0-5. The five command queues 200-0-1 to 200-0-5 respectively correspond to the submission queues SQ1 to SQ5 as described above. When the read command CMD0 corresponding to the CCID0 is stored in the submission queue SQ1, the command dispatcher (CD0) 451-0 stores the CCID0 in the command queue 200-0-1.

The command dispatcher (CD0) 451-0 selects one command queue, from which the CCID is to be fetched, from the command queues 200-0-1 to 200-0-5. For example, the command dispatcher (CD0) 451-0 may select one command queue, from which the CCID is to be fetched, by using round robin arbitration.

In response to fetching the CCID0 from the command queue 200-0-1, the command dispatcher (CD0) 451-0 acquires the cluster read requests R0 to R3 from the CCID queue 100-0 corresponding to the CCID0.

The command dispatcher (CD0) 451-0 generates a page read request for reading the data parts d0 to d3, based on the acquired cluster read requests R0 to R3. The command dispatcher (CD0) 451-0 transmits the generated page read request to the flash die #0 via the NAND interface 46.

The command dispatcher (CD0) 451-0 generates a page read request and then returns the CCID0 to the linked list manager 44. Furthermore, the command dispatcher (CD0) 451-0 notifies the linked list manager 44 of the number of processed cluster read requests (here, 4).

When CCID0 is returned, the linked list manager 44 deletes the cluster read requests R0 to R3 from the CCID queue 100-0. The linked list manager 44 refers to the cluster read request R4 at the head of the remaining cluster read requests R4 to R7 of the CCID queue 100-0. Based on the MCA included in the cluster read request R4, the linked list manager 44 determines that the data part d4 associated with the cluster read request R4 is stored in the flash die #x. The linked list manager 44 transmits CCID0 to the command dispatcher (CD1) 451-2 corresponding to the flash die #x. The command dispatcher (CD1) 451-1 stores the CCID0 in the command queue 200-x-1 corresponding to the submission queue SQ1.

The command dispatcher (CD1) 451-1 selects the command queue 200-x-1 and acquires the CCID0.

In response to acquiring the CCID0, the command dispatcher (CD1) 451-1 acquires the unprocessed cluster read requests R4 to R7 from the CCID queue 100-0 corresponding to the CCID0.

The command dispatcher (CD1) 451-1 generates a page read request for reading the data parts d4 to d7 based on the acquired cluster read requests R4 to R7. The command dispatcher (CD1) 451-1 transmits the generated page read request to the flash die #x via the NAND interface 46.

The command dispatcher (CD1) 451-1 generates a page read request, and returns the acquired CCID0 to the linked list manager 44. Furthermore, the command dispatcher (CD1) 451-1 notifies the linked list manager 44 of the number of processed cluster read requests (here, 4).

When the CCID0 is returned, the linked list manager 44 deletes the cluster read requests R4 to R7 from the CCID queue 100-0. The linked list manager 44 releases a correspondence relationship between the read command CMD0 and the CCID0 as the unprocessed cluster read requests are not stored in the CCID queue 100-0 corresponding to the returned CCID0. The CCID0 is an identifier that is allocable to a new read command.

Figure 6:
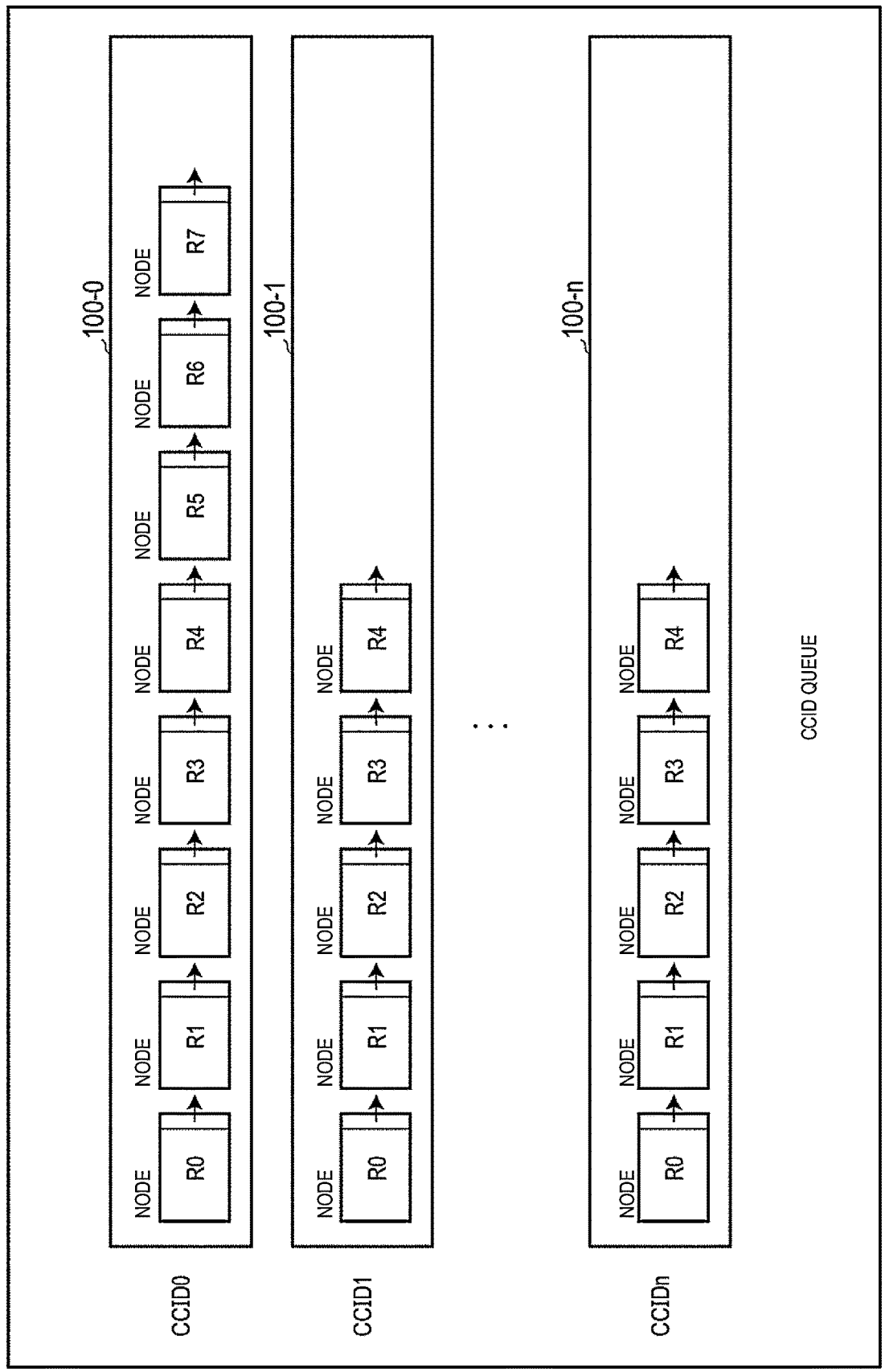
FIG. 6 is a diagram illustrating a configuration example of a linked list managed by the linked list manager of the memory system according to the embodiment.

Next, a CCID queue implemented as a linked list will be described. FIG. 6 is a diagram illustrating a configuration example of a linked list managed by the linked list manager 44 of the SSD 3 according to the embodiment.

The linked list manager 44 manages the plurality of CCID queues 100-0 to 100-$n$. The CCID queues 100-0 to 100-$n$ correspond to the CCID0 to CCIDn, respectively. Each of the CCID queues 100-0 to 100-$n$ stores a cluster read request generated based on each of the read commands corresponding to CCID0 to CCIDn. The cluster read request stored in each of the CCID queues 100-0 to 100-$n$ is managed by a linked list.

One or more cluster read requests generated based on a read command corresponding to a certain CCID are managed by one linked list. In the linked list, a node corresponding to each cluster read request is managed. Each node includes information indicating the content of the cluster read request and a pointer indicating a node of a following cluster read request. The node may include a pointer indicating a storage location on the memory of the linked list manager 44 in which information indicating the content of the cluster read request is stored, instead of the information indicating the content of the cluster read request.

Specifically, the cluster read requests R0 to R7 stored in the CCID queue 100-0 are managed in one linked list. The cluster read requests R0 to R7 are cluster read requests generated based on the read command CMD0 corresponding to the CCID0. In the linked list, a node corresponding to the cluster read request R0 is managed as a head node. A pointer included in the node corresponding to the cluster read request R0 indicates a node corresponding to a following cluster read request R1. A pointer included in the node corresponding to the cluster read request R1 indicates the node corresponding to the cluster read request R2. As described above, pointers of the nodes corresponding to the cluster read requests R0 to R6 indicate the nodes corresponding to the following cluster read requests. A pointer included in the cluster read request R7 at the tail may be set to, for example, an invalid value. The linked list manager 44 may determine that the cluster read request R7 is the cluster read request at the tail by referring to the pointer set to an invalid value.

In this way, the controller 4 manages the cluster read requests R0 to R7 stored in the CCID queue 100-0 by using a linked list for linking the cluster read requests R0 to R7 in an order from the cluster read request R0 corresponding to the head cluster of the data to be read to the cluster read request R7 corresponding to the last cluster.

In addition, the cluster read requests stored in the other CCID queues 100-1 to 100-$n$ are also managed by one linked list, and a linked list similar to the linked list corresponding to CCID0 described above is used.

As described above, it is possible to easily delete the processed cluster read requests, add new cluster read requests, and the like while maintaining the order relationship between the cluster read requests R0 to R7 correctly, by managing the cluster read requests R0 to R7 using the linked list for linking the cluster read requests R0 to R7.

Here, a case where the cluster read request stored in the CCID queue is managed by using the linked list is described, but not only the cluster read request stored in the CCID queue but also the CCID stored in the command queue may be managed by using the linked list.

Figure 7:
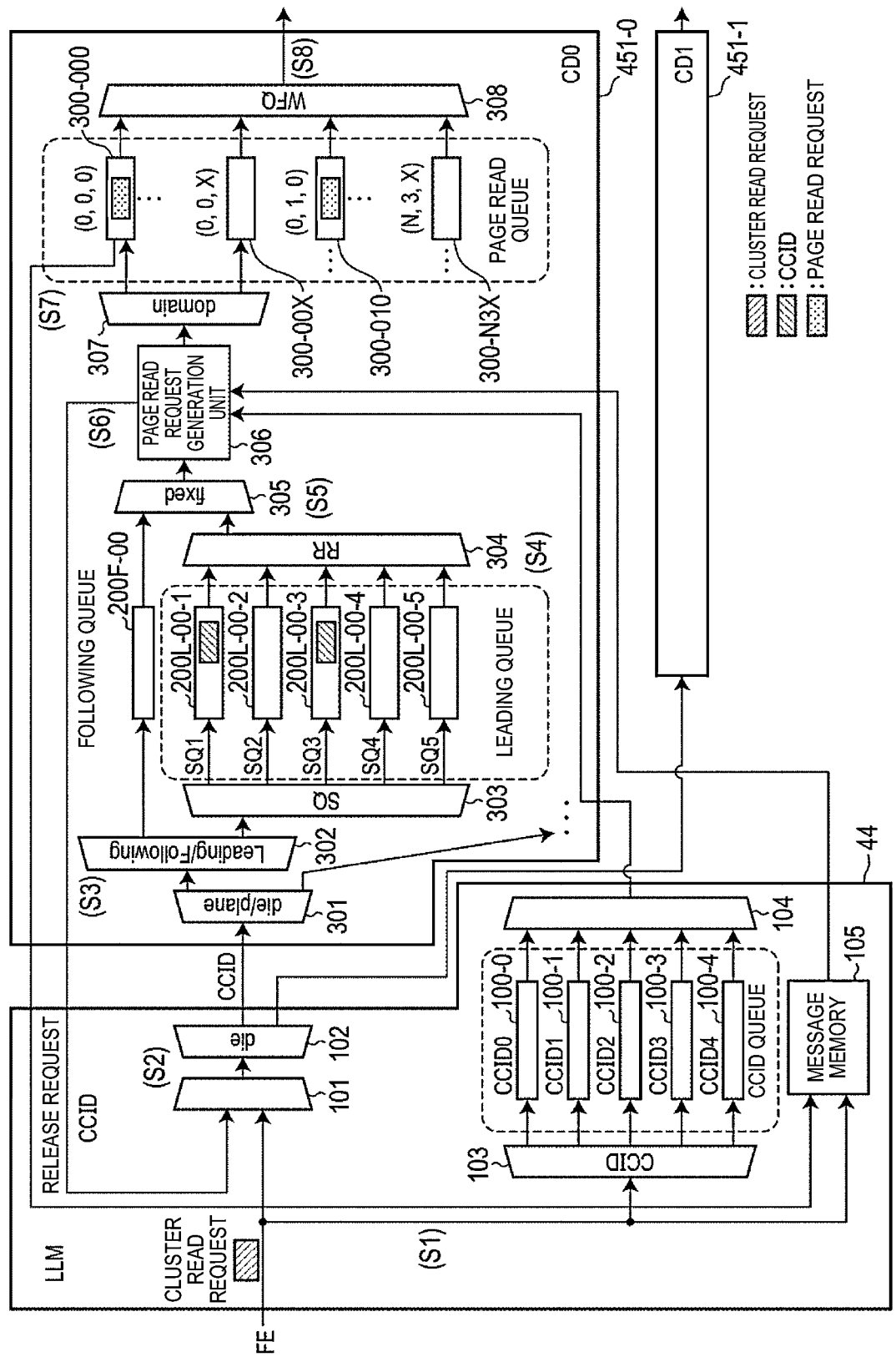
FIG. 7 is a diagram for illustrating a more detailed configuration example of the linked list manager and the command dispatcher used in the memory system according to the embodiment, with a process at the time of read execution as an example.

Next, a detailed configuration of the linked list manager 44 and the command dispatcher 451 will be described. FIG. 7 is a diagram for illustrating a more detailed configuration example of the linked list manager and the command dispatcher used in the SSD 3 according to the embodiment, with a process at the time of read execution as an example.

First, a more detailed configuration of the linked list manager and the command dispatcher will be described.

The linked list manager 44 assigns an attribute of leading or following to each of the plurality of CCIDs. For the read command for which the read process of the head cluster is not yet started, the linked list manager 44 assigns the attribute of leading to the CCID of the read command. For the read command for which the read process of the head cluster is already started, the linked list manager 44 assigns the attribute of following to the CCID of the read command.

The linked list manager 44 includes a multiplexer 101, a demultiplexer 102, a demultiplexer 103, a multiplexer 104, and a message memory 105 in addition to the CCID queues 100-0 to 100-4.

When a cluster read request is received from the front-end unit and the CCID has an attribute of leading, in other words, when a cluster read request corresponding to the head cluster of the read command is received from the front-end unit, the multiplexer 101 outputs the CCID included in the received cluster read request and the attribute indicating leading to the demultiplexer 102.

Further, when the CCID is returned from the command dispatcher CD and an unprocessed cluster read request exists in the CCID queue corresponding to the CCID, the multiplexer 101 outputs the returned CCID and the attribute indicating following to the demultiplexer 102.

The demultiplexer 102 assigns the CCID and the leading/following attribute output from the multiplexer 101 to the command dispatcher CD in charge of a flash die in which a data part corresponding to a head cluster (a head cluster of data to be read in a case of leading, and a head cluster of unprocessed remaining data in a case of following) is stored.

The demultiplexer 103 selects the CCID queue corresponding to the CCID included in the cluster read request received from the front-end unit from the CCID queues 100-0 to 100-4, and assigns the received cluster read request to the selected CCID queue.

In the configuration example of the linked list manager 44 shown in FIG. 7, the cluster read request itself is stored in the message memory 105. The CCID queue stores a pointer indicating a storage location on the message memory 105 in which a cluster read request is stored.

The CCID queues 100-0 to 100-4 and the message memory 105 are all referenceable from all the command dispatchers CD.

The multiplexer 104 selects any one of the CCID queues 100-0 to 100-4 based on the read access request from the command dispatcher CD, and transmits the information stored in the selected CCID queue to the command dispatcher CD.

The message memory 105 stores each cluster read request received by the linked list manager 44.

Next, a configuration of the command dispatcher CD will be described. Here, the command dispatcher (CD0) 451-0 corresponding to the flash die #0 will be described, and the other command dispatchers (for example, the command dispatcher (CD1) 451-1) also have the same configuration as the command dispatcher (CD0) 451-0.

The command dispatcher (CD0) 451-0 is in charge of, for example, the plane PLN0 to the plane PLN3 of the flash die #0, the plane PLN0 to the plane PLN3 of the flash die #1, . . . , and the plane PLN0 to the plane PLN3 of the flash die #N. Here, elements of the command dispatcher (CD0) 451-0 will be described with a focus on an element corresponding to the plane PLN0 of the flash die #0.

The command dispatcher (CD0) 451-0 includes a following queue 200F-00, leading queues 200L-00-1 to 200L-00-5, a demultiplexer 301, a demultiplexer 302, a demultiplexer 303, a multiplexer 304, a multiplexer 305, a page read request generation unit 306, a demultiplexer 307, and a multiplexer 308.

The following queue 200F-00 and the leading queues 200L-00-1 to 200L-00-5 are used as a command queue group corresponding to the plane PLN0 of the flash die #0.

The following queue 200F-00 stores one or more CCIDs. The following queue 200F-00 stores a CCID having the attribute of following.

Each of the leading queues 200L-00-1 to 200L-00-5 stores one or more CCIDs. Each of the leading queues 200L-00-1 to 200L-00-5 stores a CCID having the attribute of leading. The leading queues 200L-00-1 to 200L-00-5 respectively correspond to the submission queues SQ1 to SQ5. The leading queues 200L-00-1 to 200L-00-5 store the CCID corresponding to the read command issued via the corresponding submission queue.

The page read queues 300-000 to 300-N3X store page read requests. The page read queues 300-000 to 300-N3X correspond to a combination of a flash die, a plane, and a domain. The total number of domains 0 to X may be 2 or more. The controller 4 manages a correspondence relationship between the domains 0 to X and the submission queues SQ1 to SQ5 such that one or more submission queues SQ among the submission queues SQ1 to SQ5 belong to one domain. For example, when two domains (domain 0 and domain 1) are managed, each of the submission queues SQ1 to SQ5 belongs to only one of the domain 0 and the domain 1. A correspondence relationship between the domains 0 to X and the submission queues SQ1 to SQ5 may be designated in advance by the host 2. The controller 4 also manages a plurality of weights (priorities) associated with the domains 0 to X. Therefore, the domain is also referred to as a priority group. In addition, each page read queue is also referred to as a domain queue.

For example, a correspondence relationship between a plurality of domains (0 to X) and a plurality of namespaces may be managed such that two or more submission queues are allocated to one domain. The namespace is uniquely identified by a namespace identifier (NSID). When the namespace is used, the namespace identifier may be included in the read command and the cluster read request. In addition, when the SSD 3 includes a plurality of ports (for example, a dual port), that is, when the controller 4 includes a plurality of host interfaces, for example, a correspondence relationship between the plurality of domains (0 to X) and the plurality of ports may be managed such that, for example, two or more submission queues are allocated to one domain. Hereinafter, a case where a correspondence relationship between each domain and each SQ is managed will be described.

The controller 4 manages X+1 page read queues corresponding to the domains 0 to X, respectively, with respect to the plane PLN0 of the flash die #0.

For example, the page read queue 300-000 is a domain queue corresponding to (flash die #0, plane PLN0, domain 0). The page read queue 300-000 stores, among page read requests for reading data in a storage location included in the plane PLN0 of the flash die #0, a page read request generated based on a cluster read request belonging to a read command fetched from any of the submission queues belonging to the domain 0.

Similarly, the page read queue 300-00X is a domain queue corresponding to (flash die #0, plane PLN0, domain X). The page read queue 300-00X stores, among page read requests for reading data in a storage location included in the plane PLN0 of the flash die #0, a page read request generated based on a cluster read request belonging to a read command fetched from any of the submission queues belonging to the domain X.

When a page read request is output from a certain page read queue, a release request is transmitted to the message memory 105. The release request is a request for releasing a storage area in the message memory 105 in which the cluster read request used to generate the page read request is stored. The released storage area is available for storing a new cluster read request.

The demultiplexer 301 distributes the received CCID based on the flash die and the plane. The demultiplexer 301 specifies a flash die and a plane in which a data part associated with a head cluster read request stored in a CCID queue corresponding to the received CCID is stored. The demultiplexer 301 distributes the received CCID to any command queue of the command queue group (a following queue and a plurality of leading queues) corresponding to the specified flash die and the specified plane.

When the received CCID has the attribute of following, the demultiplexer 302 stores the CCID in the following queue 200F-00. Further, when the received CCID has the attribute of leading, the demultiplexer 302 passes the CCID to the demultiplexer 303.

The demultiplexer 303 distributes the received CCID to any of the leading queues 200L-00-1 to 200L-00-5. Specifically, the demultiplexer 303 selects a leading queue corresponding to a submission queue from which a read command corresponding to the received CCID is fetched. The demultiplexer 303 stores the received CCID in the selected leading queue.

When the read command corresponding to the received CCID is, for example, the read command fetched from the submission queue SQ1, the demultiplexer 303 stores the received CCID in the leading queue 200L-00-1. When the read command corresponding to the received CCID is, for example, the read command fetched from the submission queue SQ3, the demultiplexer 303 stores the received CCID in the leading queue 200L-00-1.

The multiplexer 304 selects a leading queue from which the CCID is to be fetched. The multiplexer 304 is implemented by, for example, a round robin arbitration mechanism. The multiplexer 304 sequentially selects a leading queue storing the CCID from among the leading queues 200L-00-1 to 200L-00-5. The multiplexer 304 outputs the CCID stored in the selected leading queue.

The multiplexer 305 selects a CCID to be processed. When the CCID is stored in the following queue 200F-00, the multiplexer 305 acquires the CCID stored in the following queue 200F-00 and transmits the acquired CCID to the page read request generation unit 306. When the CCID is not stored in the following queue 200F-00, the multiplexer 305 selects the CCID to be output from the multiplexer 304 and transmits the selected CCID to the page read request generation unit 306.

In this way, the multiplexer 305 selects the CCID stored in the following queue 200F-00 as the CCID to be processed with priority over the CCID stored in the leading queues 200L-00-1 to 200L-00-5.

The page read request generation unit 306 generates a page read request based on the CCID (that is, the CCID to be processed) received from the multiplexer 305. The page read request generation unit 306 sequentially refers to the cluster read requests stored in the CCID queue corresponding to the CCID to be processed from a head of the cluster read requests, and acquires, for example, four pointers respectively indicating storage locations in which four cluster read requests are stored in the CCID queue. The page read request generation unit 306 acquires four cluster read requests from the message memory 105 based on the received pointers. The page read request generation unit 306 generates a page read request based on the received four cluster read requests.

After generating the page read request, the page read request generation unit 306 returns the CCID to be processed to the linked list manager 44. The timing for returning the CCID to the linked list manager 44 may be changed according to a workload or the like.

The demultiplexer 307 distributes the page read request to any one of the page read queues 300-000 to 300-00X based on the domain to which the submission queue from which the read command to be processed corresponding to the CCID is fetched belongs. For example, when the submission queue from which the read command corresponding to the CCID to be processed is fetched is the submission queue SQ1 and the submission queue SQ1 belongs to the domain 0, the demultiplexer 307 selects the page read queue 300-000 corresponding to the domain 0 and stores the page read request in the page read queue 300-000.

The multiplexer 308 selects a page read queue from which the page read request is to be fetched. That is, the multiplexer 308 executes an arbitration process of selecting a page read queue, from which the page read request is to be fetched, from the page read queues 300-000 to 300-00X, based on the weights respectively associated with the domains 0 to X. The arbitration process is executed based on, for example, weighted fair queuing. The multiplexer 308 issues the page read request stored in the selected page read queue to the flash die #0 (specifically, the plane PLN0 of the flash die #0) via the NAND interface 46.

Next, a procedure (step (S1) to step (S9)) of the read process executed by using the linked list manager and the command dispatcher described in FIG. 7 will be described with reference to the same drawing. The back-end unit of the controller 4 starts the read process in response to receiving the cluster read request from the front-end unit.

Step (S1): The linked list manager 44 stores the received cluster read request in the CCID queue. The CCID queue in which the cluster read request is stored is a CCID queue corresponding to the CCID included in the received cluster read request. In this case, for example, the linked list manager 44 stores information indicating the content of the cluster read request in the message memory 105, and stores a node including a pointer or the like indicating a storage location of the message memory 105 in which the content of the cluster read request is stored, as an element of the linked list, in the CCID queue.

Step (S2): When the cluster read request is received from the front-end unit and the CCID included in the received cluster read request is an attribute of leading, the linked list manager 44 transmits the CCID and an attribute indicating leading to the command dispatcher CD in charge of the flash die in which the data part corresponding to the head cluster is stored. The head cluster is a head cluster of data to be read associated with a read command corresponding to the CCID. The linked list manager 44 specifies a flash die in which a data part corresponding to the head cluster is stored, based on the MCA included in the cluster read request at the head of the cluster read request including the CCID.

In addition, when the CCID is returned from a certain command dispatcher CD and an unprocessed cluster read request exists in the CCID queue corresponding to the returned CCID, the linked list manager 44 transmits the CCID and an attribute indicating following to the command dispatcher CD in charge of a flash die in which a data part corresponding to a head cluster of unprocessed remaining data is stored. The data part corresponding to the head cluster of the remaining data is a data part associated with the cluster read request at a head of the unprocessed cluster read request including the CCID. The linked list manager 44 specifies a flash die in which a data part corresponding to the head cluster of the remaining data is stored, based on the MCA included in the cluster read request at the head of the unprocessed cluster read request including this CCID.

For example, when the data part corresponding to the head cluster is stored in the plane PLN0 of the flash die #0, the linked list manager 44 transmits the CCID and the leading/following attribute of the CCID to the command dispatcher (CD0) 451-0.

Step (S3): The command dispatcher CD that received the CCID selects a command queue in which the received CCID is to be stored, based on a plane in which a data part corresponding to a head cluster is stored, a die including the plane, an attribute of the received CCID, and a submission queue SQ from which a corresponding read command is fetched.

For example, when the data part corresponding to the head cluster is stored in the plane PLN0 of the flash die #0 and the received CCID has the attribute of leading, the command dispatcher (CD0) 451-0 selects the leading queue corresponding to the submission queue SQ from which the corresponding read command is fetched from the leading queue 200L-00-1 to 200L-00-5. The command dispatcher (CD0) 451-0 stores the received CCID in the selected leading queue.

For example, when the data part corresponding to the head cluster is stored in the plane PLN0 of the flash die #0 and the received CCID has the attribute of following, the command dispatcher (CD0) 451-0 selects the following queue 200F-00 and stores the received CCID in the selected following queue 200F-00.

Step (S4): The command dispatcher (CD0) 451-0 selects a leading queue from which the CCID is to be fetched from the leading queues 200L-00-1 to 200L-00-5, taking fairness between the submission queues SQ1 to SQ5 into consideration. The command dispatcher (CD0) 451-0 acquires the CCID from the selected leading queue.

Step (S5): When the CCID is stored in the following queue 200F-00, the command dispatcher (CD0) 451-0 acquires the CCID stored in the following queue 200F-00 and transmits the acquired CCID to the page read request generation unit 306. In addition, when the CCID is not stored in the following queue 200F-00, the command dispatcher (CD0) 451-0 transmits the CCID acquired from the leading queue in step (S4) to the page read request generation unit 306.

Step (S6): The page read request generation unit 306 generates a page read request by referring to the cluster read requests stored in the CCID queue corresponding to the CCID received in step (S5) from a head cluster read request thereof. In this case, the page read request generation unit 306 generates a page read request for reading data of one page based on the four cluster read requests. When the number of read commands received from the host 2 is small and thus a sufficient available area exists in the SRAM 43, the page read request generation unit 306 may generate a plurality of page read requests based on a larger number of cluster read requests stored in the CCID queue. The page read request generation unit 306 returns the received CCID to the linked list manager 44.

When the CCID is returned to the linked list manager 44, the linked list manager 44 deletes the processed cluster read requests (four cluster read requests used to generate the page read request) from the CCID queue.

Step (S7): The command dispatcher (CD0) 451-0 distributes the page read request generated in step (S6) to any of the page read queues 300-000 to 300-N3X. In this case, the command dispatcher (CD0) 451-0 determines a page read queue to which a page read request is to be distributed, based on a plane storing data to be read, a flash die including the plane, and a domain to which a submission queue from which a corresponding read command is fetched belongs. The command dispatcher (CD0) 451-0 transmits a release request to the message memory 105 and releases a storage area of the message memory 105 in which the cluster read request used to generate the page read request is stored. The linked list manager 44 may release the storage area of the message memory 105 based on the release request from the command dispatcher (CD0) 451-0.

Step (S8): The command dispatcher (CD0) 451-0 executes the arbitration process (WFQ) for selecting the page read queue from which the page read request is to be fetched from the page read queues 300-000 to 300-N3X, based on the weights respectively associated with the domains 0 to X. With the WFQ, it is possible to fairly select a domain to which the same weight is associated among several domains belonging to the same flash die. The command dispatcher (CD0) 451-0 issues the page read request stored in the selected page read queue to the NAND flash memory 5. For example, when the page read queue 300-000 is selected, the command dispatcher (CD0) 451-0 issues the page read request stored in the page read queue 300-000 to the plane PLN0 of the flash die #0.

Here, the read process corresponding to the cluster read requests R0 to R7 described in FIG. 4 will be described. Hereinafter, it is assumed that the first data (d0 to d3) corresponding to the cluster read requests R0 to R3 is stored in the flash die #0, and the second data (d4 to d7) corresponding to the cluster read requests R4 to R7 is stored in the flash die #x. The command dispatcher CD in charge of the flash die #0 is a command dispatcher CD0, and the command dispatcher CD in charge of the flash die #x is a command dispatcher CD1.

The controller 4 manages five leading queues respectively corresponding to the submission queues SQ1 to SQ5 as a leading queue group corresponding to the flash die #0. Further, the controller 4 manages five leading queues corresponding to the submission queues SQ1 to SQ5 as a leading queue group corresponding to the flash die #x.

First, a read process when a page read queue group corresponding to a domain group is not used will be described.

When the read command CMD0 described with reference to FIG. 4 is fetched from the submission queue SQ1, the controller 4 selects a leading queue corresponding to the submission queue SQ1 from the leading queue group corresponding to the flash die #0. The controller 4 stores the identifier (CCID0) assigned to the read command CMD0 in the selected leading queue.

The controller 4 executes an arbitration process of selecting a leading queue, from which the CCID is to be fetched, from the leading queue group corresponding to the flash die #0. When the CCID0 is fetched from the leading queue corresponding to the submission queue SQ1 by the arbitration process, the controller 4 generates a page read request for reading the first data (d0 to d3) from the flash die #0 and issues the generated page read request to the flash die #0.

Next, a read process when a page read queue group corresponding to the domain group is used will be described.

The controller 4 manages a correspondence relationship between the domains 0 to X and the submission queues SQ1 to SQ5 such that one or more submission queues SQ among the submission queues SQ1 to SQ5 belong to one domain.

The controller 4 manages X+1 first page read queues corresponding to the domains 0 to X, respectively, with respect to the flash die #0. The controller 4 manages X+1 second page read queues corresponding to the domains 0 to X, respectively, with respect to the flash die #x.

In response to generating the page read request for reading the first data (d0 to d3) from the flash die #0, the controller 4 selects one first page read queue corresponding to one domain to which the submission queue (here, SQ1) from which the read command CMD0 is fetched belongs, from the X+1 first page read queues. The controller 4 stores the generated page read request in one selected first page read queue.

The controller 4 executes an arbitration process (WFQ) for selecting a page read queue, from which the page read request is to be fetched, from X+1 first page read queues based on a plurality of weights associated with the domains 0 to X.

When the page read queue in which the page read request for reading the first data (d0 to d3) is stored is selected by the WFQ, the controller 4 fetches the page read request for reading the first data (d0 to d3) from the selected page read queue. The controller 4 issues the page read request for reading the first data (d0 to d3) to the flash die #0.

Next, a process that is executed after the page read request for reading the second data (d4 to d7) from the flash die #x is generated will be described.

In response to generating the page read request for reading the second data (d4 to d7) from the flash die #x, the controller 4 selects one second page read queue corresponding to one domain to which the submission queue (here, SQ1) from which the read command CMD0 is fetched belongs, from the X+1 second page read queues. The controller 4 stores the generated page read request in the selected one second page read queue.

The controller 4 executes an arbitration process (WFQ) for selecting a page read queue, from which the page read request is to be fetched, from X+1 second page read queues, based on a plurality of weights associated with the domains 0 to X.

When the page read queue in which the page read request for reading the second data (d4 to d7) is stored is selected by the WFQ, the controller 4 fetches the page read request for reading the second data (d4 to d7) from the selected page read queue. The controller 4 issues the page read request for reading the second data (d4 to d7) to the flash die #x.

Figure 8A:
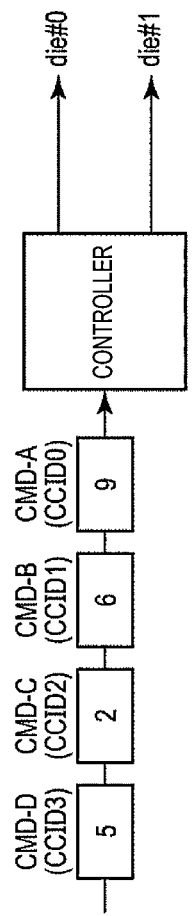
FIGS. 8A and 8B are diagrams illustrating an example of management of read data in a memory system according to a comparative example.
Figure 8B:
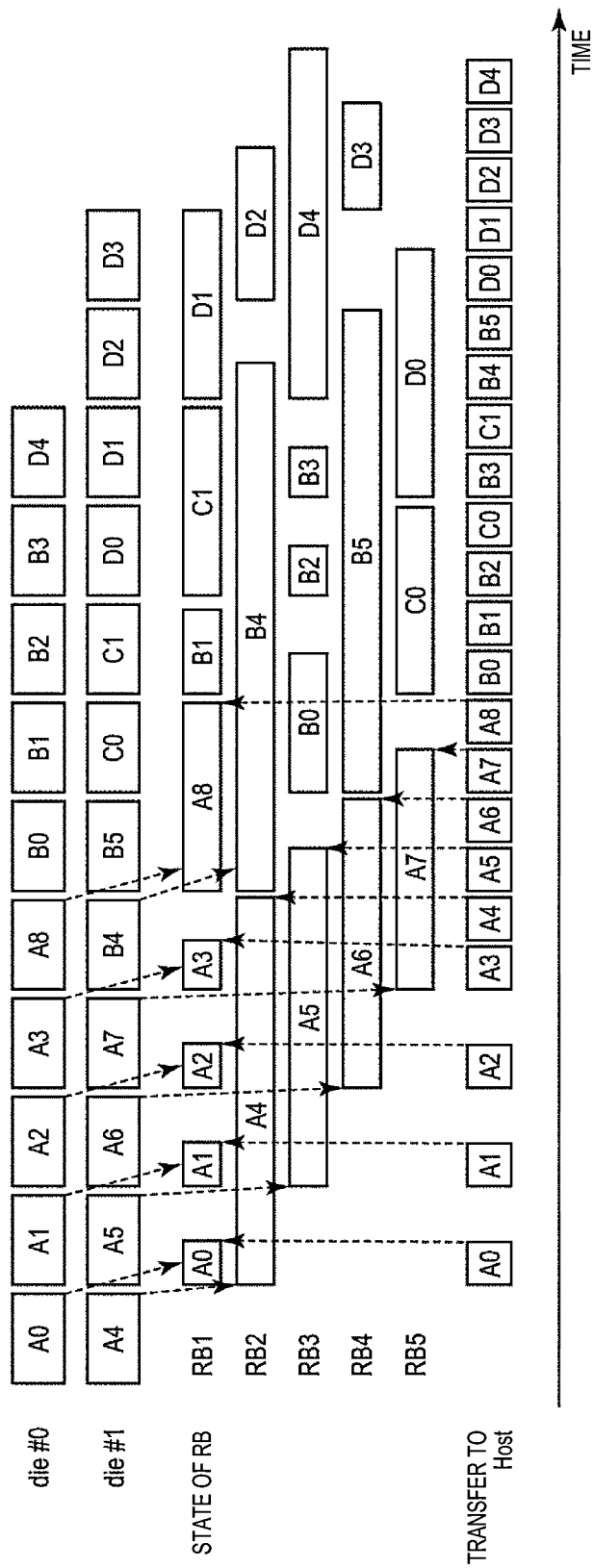

Next, an example of using the read buffer 431 in the read process will be described. First, a usage example of the read buffer in the comparative example is assumed. FIGS. 8A and 8B are diagrams illustrating an example of management of read data in the memory system according to the comparative example.

In FIGS. 8A and 8B, it is assumed that in the two flash dies (die #0 and die #1), each data is written across in the flash die #0 and the flash die #1 such that four clusters of data are written per one flash die.

As illustrated in FIG. 8A, each of the read commands CMD-A, CMD-B, and CMD-D is a read command for reading data stored in the two flash dies (die #0 and die #1). The read command (CCID0) CMD-A is associated with data to be read having a size of nine clusters. The read command (CCID1) CMD-B is associated with data to be read having a size of six clusters. The read command (CCID2) CMD-C is associated with data to be read having a size of two clusters. The read command (CCID3) CMD-D is associated with data to be read having a size of five clusters.

As illustrated in FIG. 8B, the number of cluster read requests in accordance with the size of the data to be read associated with each read command is generated based on each read command. For example, nine cluster read requests for respectively reading the data parts A0 to A8 are generated based on the read command (CCID0) CMD-A. Six cluster read requests for respectively reading the data parts B0 to B5 are generated based on the read command (CCID1) CMD-B. Two cluster read requests for respectively reading the data parts C0 to C1 are generated based on the read command (CCID2) CMD-C. Five cluster read requests for respectively reading the data parts D0 to D4 are generated based on the read command (CCID3) CMD-D.

In the flash die #0, a plurality of cluster read requests are executed such that a plurality of data parts are read in an order of A0, A1, A2, A3, A8, B0, B1, B2, B3, and D4. In addition, in the flash die #1, a plurality of cluster read requests are executed such that a plurality of data parts are read in an order of A4, A5, A6, A7, B4, B5, C0, C1, D0, D1, D2, and D3.

First, when the data part A0 is read from the flash die #0 and the data part A4 is read from the flash die #1, the first read buffer RB1 is allocated from the SRAM, the data part A0 is stored in the first read buffer RB1, the second read buffer RB2 is allocated from the SRAM, and the data part A4 is stored in the second read buffer RB2. The controller transfers the data part A0 to the host. Since the data part A4 is data that cannot be transferred to the host until the data part A3 is transferred to the host 2, the data part A4 occupies the second read buffer RB2. That is, the data part A4 remains in the second read buffer RB2.

Therefore, it is necessary to allocate other read buffers (a third read buffer RB3 to a fifth read buffer RB5) from the SRAM to temporarily store the data to be read thereafter.

Specifically, when the data part A1 is read from the flash die #0 and the data part A5 is read from the flash die #1, the data part A1 is stored in the first read buffer RB1 and the data part A5 is stored in the third read buffer RB3 newly allocated from the SRAM. The controller transfers the data part A1 to the host. Since the data part A5 is data that cannot be transferred to the host until the data part A4 is transferred to the host 2, the data part A5 occupies the third read buffer RB3.

Next, when the data part A2 is read from the flash die #0 and the data part A6 is read from the flash die #1, the data part A2 is stored in the first read buffer RB1 and the data part A6 is stored in the fourth read buffer RB4 newly allocated from the SRAM. The controller transfers the data part A2 to the host. Since the data part A6 is data that cannot be transferred to the host until the data part A5 is transferred to the host 2, the data part A6 occupies the fourth read buffer RB4.

Next, when the data part A3 is read from the flash die #0 and the data part A7 is read from the flash die #1, the data part A3 is stored in the first read buffer RB1 and the data part A7 is stored in the fifth read buffer RB5 newly allocated from the SRAM. The controller transfers the data part A3 to the host. Since the data part A7 is data that cannot be transferred to the host until the data part A6 is transferred to the host 2, the data part A7 occupies the fifth read buffer RB5.

When the data part A3 is transferred to the host, the data part A4 occupying the read buffer RB2 becomes transferable to the host. When the data part A4 is transferred, the data parts A5, A6, and A7 that follow the data part A4 also become transferable subsequently, and thus the read buffers RB3, RB4, and RB5 also become available again.

When the data part A8 is read from the flash die #0 and the data part B4 is read from the flash die #1, the data part A8 is stored in the first read buffer RB1 and the data part B4 is stored in the second read buffer RB2 that becomes available by transferring the data part A4 to the host. The data part A8 stored in the first read buffer RB1 becomes transferrable after the data part A7 is transferred to the host. Since the data part B4 is data that cannot be transferred to the host until the data part B3 that is not yet read from the flash die #3 is transferred, the data part B4 occupies the second read buffer RB2.

As described above, in the comparative example, since data reading based on the cluster read request corresponding to the same CCID is simultaneously executed by the two flash dies, a data part that cannot be immediately transferred to the host is stored in the read buffer. Therefore, as shown in FIGS. 8A and 8B, the first read buffer RB1 to the fifth read buffer RB5 are required when the data parts A0 to A8 corresponding to the read command CMD-A are read.

Figure 9A:
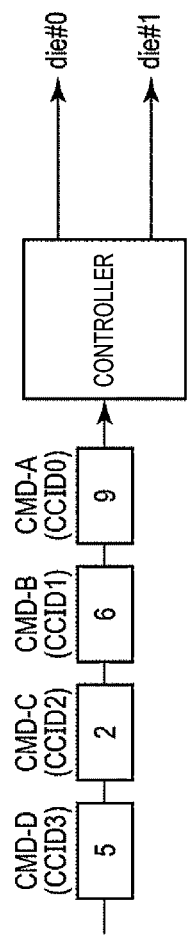
FIGS. 9A and 9B are diagrams illustrating an example of management of read data in the memory system according to the embodiment.
Figure 9B:
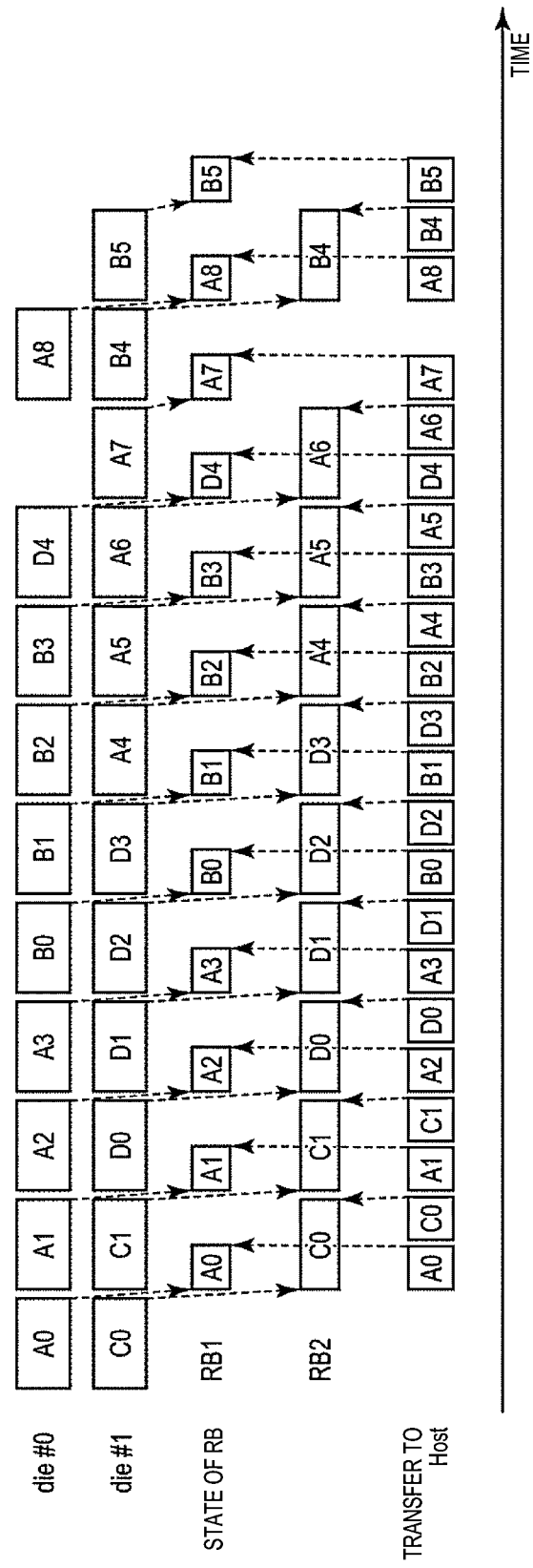

In the read process according to the present embodiment, when the page read request is generated by the page read request generation unit 306, the CCID is returned to the linked list manager 44, and then the CCID is transferred to the command dispatcher for the following page read request. Therefore, a following page read request is issued after the issuance of the preceding page read request. FIGS. 9A and 9B are diagrams illustrating an example of management of read data in the memory system according to the embodiment.

FIG. 9A also shows a case where the cluster read request is generated in the same manner as in FIG. 8A.

In FIG. 9B, in the flash die #0, a plurality of cluster read requests are executed such that a plurality of data parts are read in an order of A0, A1, A2, A3, B0, B1, B2, B3, D4, and A8. In addition, in the flash die #1, a plurality of cluster read requests are executed such that a plurality of data parts are read in an order of C0, C1, D0, D1, D2, D3, A4, A5, A6, A7, B4, and B5.

First, when the data part A0 is read from the flash die #0 and the data part C0 is read from the flash die #1, the first read buffer RB1 is allocated from the SRAM 43, the data part A0 is stored in the first read buffer RB1, the second read buffer RB2 is allocated from the SRAM 43, and the data part C0 is stored in the second read buffer RB2. The controller 4 transfers the data part A0 to the host 2. When the transfer of the data part A0 is completed, the controller 4 transfers the data part C0 to the host 2. Since the data part A0 and the data part C0 are the data parts at the head of the data parts corresponding to the read command CMD-A and the read command CMD-C, respectively, it is not necessary to wait for the other data parts to be transferred to the host 2.

Thereby, the first read buffer RB1 and the second read buffer RB2 are in a state capable of storing new data until the reading of the following data parts A1 and C1 is completed.

After that, when the data part A1 is read from the flash die #0, and the data part C1 is read from the flash die #1, the data part A1 is stored in the first read buffer RB1 and the data part C1 is stored in the second read buffer RB2. When the data part A1 is read, since the transfer of the data part A0 is already completed, the controller 4 transfers the data part A1 to the host 2. When the transfer of the data part A1 is completed, since the transfer of the data part C0 is already completed, the controller 4 transfers the data part C1 to the host 2. Thereby, the reading of the data part corresponding to the read command CMD-C is completed.

Next, when the data part A2 is read from the flash die #0 and the data part D0 is read from the flash die #1, the data part A2 is stored in the first read buffer RB1 and the data part D0 is stored in the second read buffer RB2. When the data part A2 is read, since the transfer of the data part A1 is already completed, the controller 4 transfers the data part A2 to the host 2. When the transfer of the data part A2 is completed, the data part D0 is transferred to the host 2. Since the data part D0 is the data part at the head of the data parts corresponding to the read command CMD-D, it is not necessary to wait for the other data parts.

Next, when the data part A3 is read from the flash die #0 and the data part D1 is read from the flash die #1, the data part A3 is stored in the first read buffer RB1 and the data part D1 is stored in the second read buffer RB2. When the data part A3 is read, since the transfer of the data part A2 is already completed, the controller 4 transfers the data part A3 to the host 2. When the transfer of the data part A3 is completed, since the transfer of the data part D0 is already completed, the controller 4 transfers the data part D1 to the host 2.

Next, when the data part B0 is read from the flash die #0 and the data part D2 is read from the flash die #1, the data part B0 is stored in the first read buffer RB1 and the data part D2 is stored in the second read buffer RB2. Since the data part B0 is the data part at the head of the data parts corresponding to the read command CMD-B, when the data part B0 is read, the controller 4 transfers the data part B0 to the host 2. When the transfer of the data part B0 is completed, since the transfer of the data part D1 is already completed, the controller 4 transfers the data part D1 to the host 2.

Next, when the data part B1 is read from the flash die #0 and the data part D3 is read from the flash die #1, the data part B1 is stored in the first read buffer RB1 and the data part D3 is stored in the second read buffer RB2. Since the transfer of the data part B0 is already completed, when the data part B1 is read, the controller 4 transfers the data part B1 to the host 2. When the transfer of the data part B1 is completed, since the transfer of the data part D2 is already completed, the controller 4 transfers the data part D3 to the host 2.

Next, when the data part B2 is read from the flash die #0 and the data part A4 is read from the flash die #1, the data part B2 is stored in the first read buffer RB1, and the data part A4 is stored in the second read buffer RB2. Since the transfer of the data part B1 is already completed, when the data part B2 is read, the controller 4 transfers the data part B2 to the host 2. When the transfer of the data part B2 is completed, since the transfer of the data part A3 is already completed, the controller 4 transfers the data part A4 to the host 2.

Next, when the data part B3 is read from the flash die #0 and the data part A5 is read from the flash die #1, the data part B3 is stored in the first read buffer RB1 and the data part A5 is stored in the second read buffer RB2. Since the transfer of the data part B2 is already completed, when the data part B3 is read, the controller 4 transfers the data part B3 to the host 2. When the transfer of the data part B3 is completed, since the transfer of the data part A4 is already completed, the controller 4 transfers the data part A5 to the host 2.

Next, when the data part D4 is read from the flash die #0 and the data part A6 is read from the flash die #1, the data part D4 is stored in the first read buffer RB1 and the data part A6 is stored in the second read buffer RB2. Since the transfer of the data part D3 is already completed, when the data part D4 is read, the controller 4 transfers the data part D4 to the host 2. Thereby, the reading of the data part corresponding to the read command CMD-D is completed. When the transfer of the data part D4 is completed, since the transfer of the data part A5 is already completed, the controller 4 transfers the data part A6 to the host 2.

Next, when the data part A7 is read from the flash die #1, the data part A7 is stored in the first read buffer RB1. Since the transfer of the data part A6 is already completed, when the data part A7 is read, the controller 4 transfers the data part A7 to the host 2.

Next, when the data part A8 is read from the flash die #0 and the data part B4 is read from the flash die #1, the data part A8 is stored in the first read buffer RB1 and the data part B4 is stored in the second read buffer RB2. Since the transfer of the data part A7 is already completed, when the data part A8 is read, the controller 4 transfers the data part A8 to the host 2. Thereby, the reading of the data part corresponding to the read command CMD-A is completed. When the transfer of the data part A8 is completed, since the transfer of the data part B3 is already completed, the controller 4 transfers the data part B4 to the host 2.

Next, when the data part B5 is read from the flash die #1, the data part B5 is stored in the first read buffer RB1. Since the transfer of the data part B4 is already completed, the controller 4 transfers the data part B5 to the host 2. Thereby, the reading of the data part corresponding to the read command CMD-B is completed.

As described above, in the present embodiment, the data part read from the NAND flash memory 5 is in a state in which the previous data is already transferred to the host 2 in LBA order, and thus can be transferred to the host 2. Therefore, only the first read buffer RB1 and the second read buffer RB2 are required when the data parts corresponding to the read commands CMD-A to CMD-D are read.

That is, in the present embodiment, the data reading related to the same CCID is performed by issuing the page read request such that the two flash dies are not operated at the same time, and thus it is possible to resolve the data remaining in the read buffer 431 and to reduce the amount of the required read buffer 431.

Here, a process of transferring data parts corresponding to the cluster read requests R0 to R7 described with reference to FIG. 4 to the host 2 will be described.

In response to reading the data part do at the head of the first data (d0 to d3) from the flash die #0, the controller 4 executes a process of storing the head data part do in the read buffer 431 and a process of transferring the head data part d0 to the memory 22 of the host 2.

In response to completing the transfer of the head data part d0 to the memory 22 of the host 2, the controller 4 releases the area of the read buffer 431 in which the head data part do is stored.

In response to reading the subsequent data part d1 included in the first data from the flash die #0, the controller 4 executes a process of storing the subsequent data part d1 in the read buffer 431 and a process of transferring the subsequent data part d1 to the memory 22 of the host 2.

In response to completing the transfer of the subsequent data part d1 to the memory 22 of the host 2, the controller 4 releases the area of the read buffer 431 in which the subsequent data part d1 is stored.

In response to reading the last data part d3 among the plurality of data parts included in the first data from the flash die #0, the controller 4 executes a process of storing the last data part d3 in the read buffer 431 and a process of transferring the last data part d3 to the memory 22 of the host 2.

In response to completing the transfer of the last data part d3 to the memory 22 of the host 2, the controller 4 releases the area of the read buffer 431 in which the last data part d3 is stored.

In response to reading the head data part d4 included in the second data (d4 to d7) from the flash die #x after the last data part d3 is transferred to the memory 22 of the host 2, the controller 4 executes a process of storing the head data part d4 of the second data in the read buffer 431 and a process of transferring the head data part d4 of the second data to the memory 22 of the host 2.

In response to completing the transfer of the head data part d4 of the second data to the memory 22 of the host 2, the controller 4 releases the area of the read buffer 431 in which the head data part d4 of the second data is stored.

In this way, the controller 4 transfers the data parts d0 to d7 corresponding to the cluster read requests R0 to R7 to the host 2 in LBA order.

Figure 10:
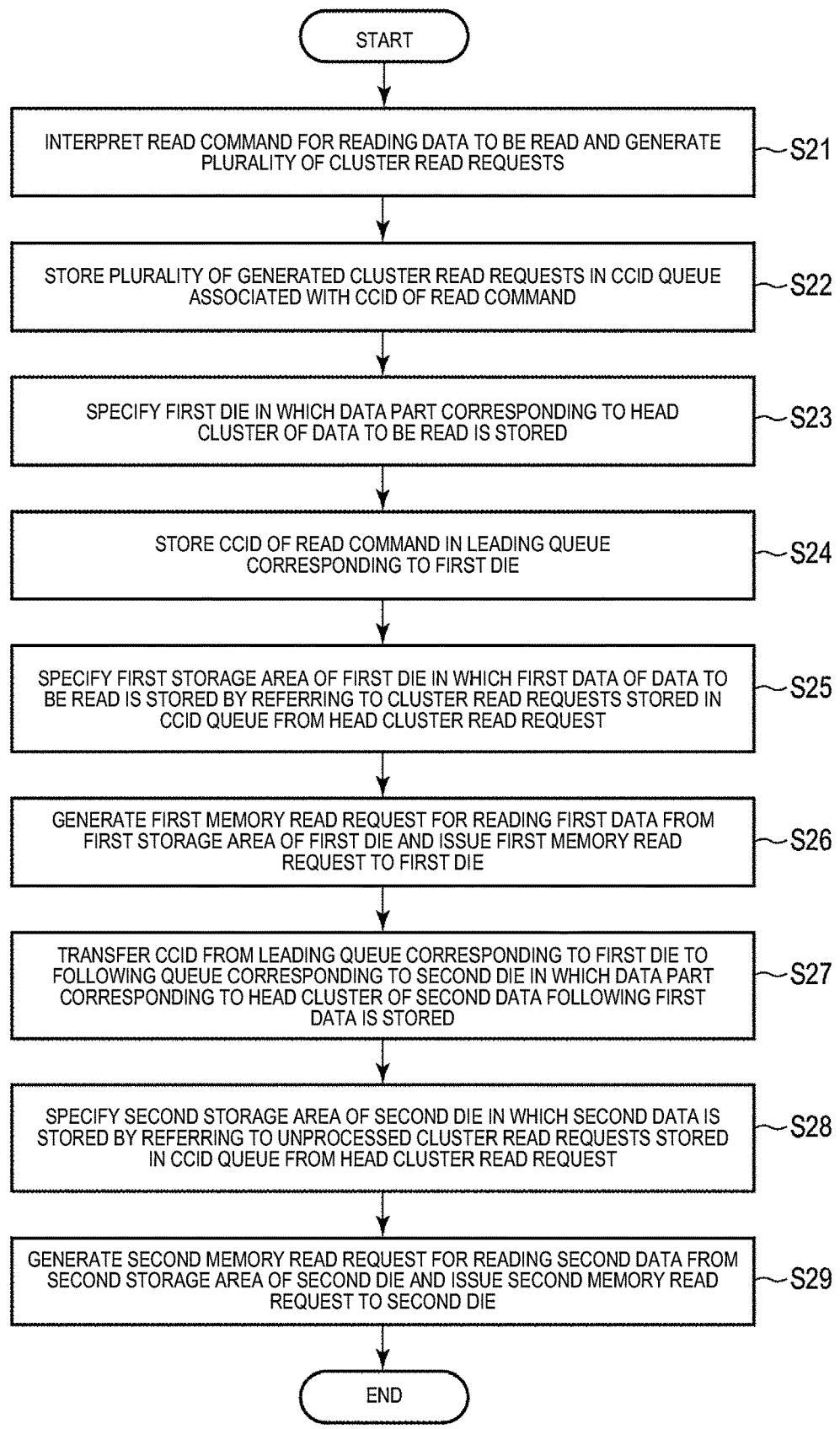
FIG. 10 is a flowchart illustrating a procedure of a read process executed in the memory system according to the embodiment.

FIG. 10 is a flowchart showing a procedure of a read process executed in the memory system according to the embodiment (steps S21 to S29). The controller 4 starts a read process in response to receiving the read command from the host 2.

The controller 4 interprets the read command for reading the data to be read and generates a plurality of cluster read requests (step S21).

The controller 4 stores the plurality of cluster read requests generated in step S21 in the CCID queue associated with the CCID of the received read command (step S22). For example, the controller 4 manages the plurality of cluster read requests by a linked list such that the plurality of cluster read requests are linked in LBA order.

The controller 4 refers to the CCID queue and specifies the first flash die in which the data part corresponding to the head cluster of the data to be read is stored (step S23). The controller 4 specifies the flash die in which a data part corresponding to a head cluster is stored, based on the MCA included in the cluster read request at the head of a plurality of cluster read requests stored in the CCID queue.

The controller 4 stores the CCID corresponding to the read command received from the host 2 in the leading queue corresponding to the first flash die (step S24). The leading queue corresponds to a submission queue in which the read command received by the controller 4 is stored.

The controller 4 specifies a first storage area of the first flash die in which the first data of the data to be read is stored by referring to the plurality of cluster read requests stored in the CCID queue from a head cluster read request thereof (step S25).

The controller 4 generates a first memory read request for reading the first data from the first storage area of the first flash die specified in step S25, and issues the generated first memory read request to the first flash die (step S26).

The controller 4 transfers the CCID from the leading queue corresponding to the first flash following queue corresponding to the second flash die in which the data part corresponding to the head cluster of the second data following the first data is stored (step S27).

The controller 4 specifies a second storage area of the second flash die in which the second data is stored by referring to unprocessed cluster read requests stored in the CCID queue from a head cluster read request thereof (step S28).

The controller 4 generates a second memory read request for reading the second data from the second storage area of the second flash die specified in step S28, and issues the second memory read request to the second flash die (step S29).

Thereby, the controller 4 executes a process of issuing the second memory read request for reading the second data to the second flash die after a process of issuing the first memory read request for reading the first data to the first flash die. Therefore, it is possible for the controller 4 to read a plurality of data parts of the data to be read in LBA order in the data to be read. Since the data part corresponding to the LBA immediately preceding the LBA of the read data part is already transferred to the host 2, it is possible for the controller 4 to immediately transfer the read data part to the host 2. Therefore, the time for which the read data part remains in the read buffer 431 is shortened.

Figure 11:
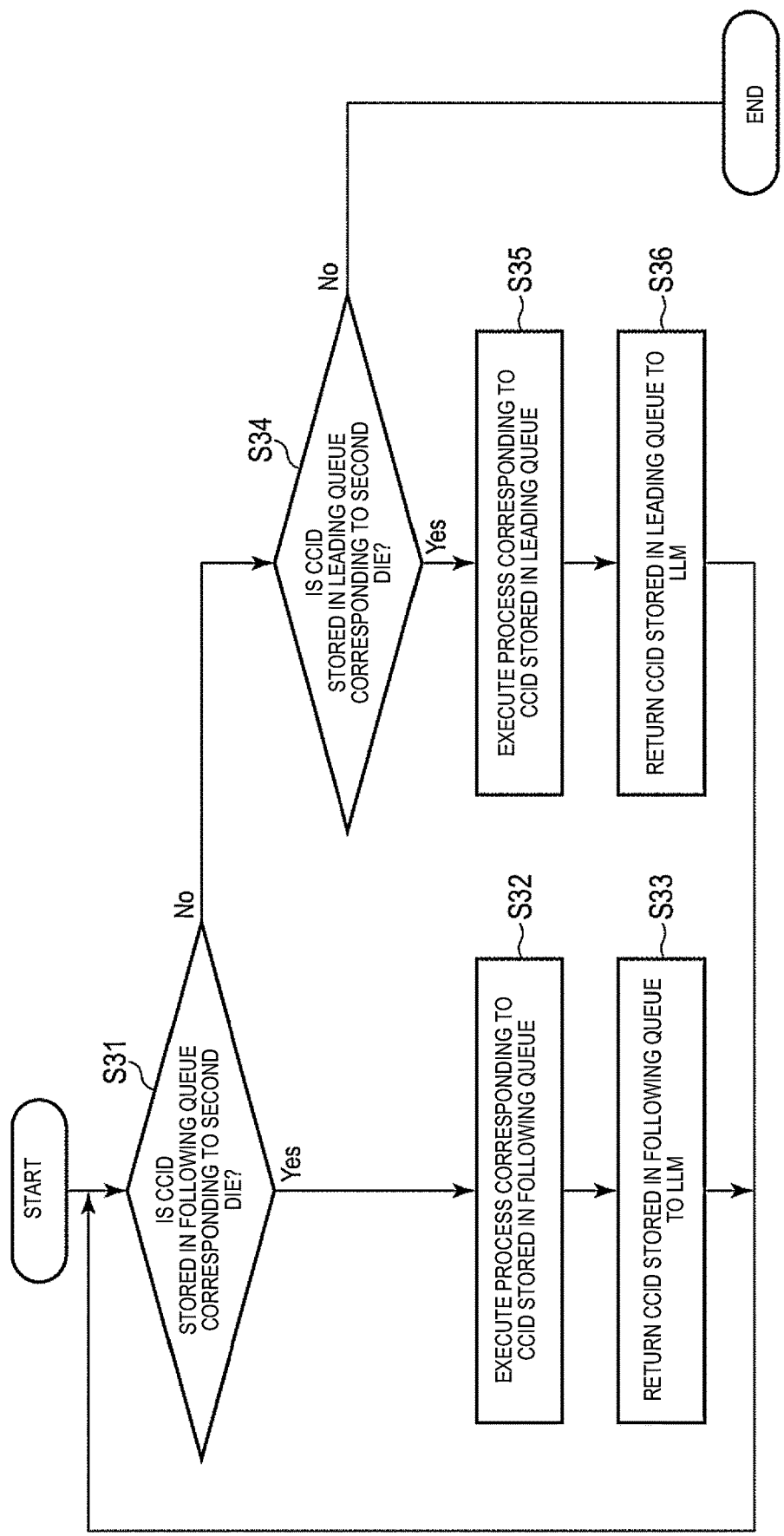
FIG. 11 is a flowchart illustrating a procedure of a page read request issue process executed in the memory system according to the embodiment.

Next, a procedure of an issuing process of a page read request will be described. FIG. 11 is a flowchart showing a procedure of a page read request issue process executed in the SSD 3 according to the embodiment (steps S31 to S36). The command dispatcher 451 of the controller 4 starts a page read request issue process in response to storing the CCID in the command queue (following queue or leading queue). Here, it is assumed that the CCID is stored in the command queue corresponding to the second flash die.

The controller 4 determines whether the CCID is stored in the following queue corresponding to the second flash die (step S31).

When the CCID is stored in the following queue (Yes in S31), the controller 4 executes a process corresponding to the CCID stored in the following queue (step S32).

The controller 4 returns the CCID stored in the following queue to the linked list manager 44 (step S33). The controller 4 returns to step S31 and determines whether the following CCID is stored in the command queue.

When the CCID is not stored in the following queue (No in S31), the controller 4 determines whether the CCID is stored in the leading queue corresponding to the second flash die (step S34).

When the CCID is stored in the leading queue (Yes in S34), the controller 4 executes a process corresponding to the CCID stored in the leading queue (step S35).

The controller 4 returns the CCID stored in the leading queue to the linked list manager 44 (step S36). The controller 4 returns to step S31 and determines whether the following CCID is stored in the command queue.

When the CCID is not stored in the leading queue (No in S34), the controller 4 determines that the process-waiting CCID is lost, and ends the page read request issue process.

In this way, it is possible for the controller 4 to execute a process of generating a page read request based on the CCID stored in the following queue with priority over a process of generating a page read request based on the CCID stored in the leading queue. Thereby, a situation in which a following page read request issue process is not executed for a read command for which a read process of a head cluster is already started can be avoided.

As described above, according to the present embodiment, the controller 4 issues the first memory read request for reading the first data corresponding to the head cluster of data to be read associated with a certain read command to the first flash die. Thereafter, it is possible to issue a second memory read request for reading the second data that follows first data among the data to be read to the second flash die. As a result, it is possible to prevent two flash dies from being simultaneously activated by the read process based on the same read command. Therefore, a situation in which data that remains in the read buffer 431 for a long time even if the data is read from the NAND flash memory 5 is read from the NAND flash memory 5 early can be avoided.

The data read from the NAND flash memory 5 may remain in the read buffer 431, and thus a situation may occur in which new data read from the NAND flash memory 5 cannot be stored in the read buffer 431. In this case, the data read from the NAND flash memory 5 is temporarily stored in the read buffer 62 of the DRAM 6. The read buffer 62 has a slower data writing/reading speed than the read buffer 431 of the SRAM 43. Therefore, when the situation as described above occurs and the read buffer 62 of the DRAM 6 is used for temporary data storage, the read performance of the SSD 3 is decreased. Therefore, the read performance of the SSD 3 can be improved by executing the read process using the read buffer 431 of the SRAM 43 as much as possible.

That is, since the data is prevented from remaining in the read buffer 431, the read buffer 431 is efficiently used, and thus the decrease in the read performance of the SSD 3 can be prevented.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, the memory system comprising:
a non-volatile memory including a plurality of memory dies; and
a controller configured to control the plurality of memory dies,
wherein the controller is configured to:
in response to receiving a first read command requesting a reading of data to be read from the host, divide the data to be read into a plurality of data parts corresponding to a plurality of clusters, and generate a plurality of read requests each including memory address information indicating a storage location of the non-volatile memory in which a corresponding data part of the plurality of data parts is stored,
store the plurality of read requests in a first read request queue associated with a first identifier assigned to the first read command such that the plurality of read requests are linked in an order from a read request corresponding to a head cluster of the plurality of clusters to a read request corresponding to a last cluster of the plurality of clusters,
store the first identifier in a first command queue corresponding to a first memory die, the first memory die storing a first data part of the plurality of data parts corresponding to the head cluster,
in response to storing the first identifier in the first command queue, specify a first storage area of the first memory die, the first storage area storing a first data which is associated with a head of the data to be read and includes at least the first data part of the plurality of data parts, and wherein specifying the first storage area is performed by referring to the plurality of read requests stored in the first read request queue, from the read request corresponding to the head cluster,
generate a first memory read request for reading the first data from the first storage area of the first memory die,
issue the first memory read request to the first memory die,
in response to one or more unprocessed read requests of the plurality of read requests remaining in the first read request queue, transfer the first identifier from the first command queue to a second command queue corresponding to a second memory die, the second memory die storing a second data part of the plurality of data parts, the second data part corresponding to a head cluster of the one or more unprocessed read requests,
in response to transferring the first identifier to the second command queue, specify a second storage area of the second memory die, the second storage area storing a second data at a head of remaining data of the data to be read, the second data including at least the second data part of the plurality of data parts, and wherein specifying the second storage area comprises referring to the one or more unprocessed read requests stored in the first read request queue, from an unprocessed read request corresponding to a head cluster of one or more clusters corresponding to the remaining data,
generate a second memory read request for reading the second data from the second storage area of the second memory die, and
issue the second memory read request to the second memory die.

2. The memory system according to claim 1, wherein the controller is further configured to:
for the first command queue corresponding to the first memory die, manage:
a first leading queue for storing an identifier of a read command for which a read process of a head cluster has not started, and
a first following queue for storing an identifier of a read command for which the read process of the head cluster has already started,
for the second command queue corresponding to the second memory die, manage:
a second leading queue for storing an identifier of a read command for which a read process of a head cluster has not started, and
a second following queue for storing an identifier of a read command for which the read process of the head cluster has already started,
store the first identifier in the first leading queue corresponding to the first memory die, transfer the first identifier from the first leading queue corresponding to the first memory die to the second following queue corresponding to the second memory die, and execute a process of generating the second memory read request based on the first identifier transferred to the second following queue corresponding to the second memory die, the process of generating the second memory read request having priority over a process of generating another memory read request for reading another data from the second memory die based on the identifier stored in the second leading queue corresponding to the second memory die.

3. The memory system according to claim 2,
wherein the controller is further configured to:
  for the first leading queues corresponding to the first memory die, manage a plurality of the first leading queues respectively corresponding to a plurality of submission queues on a memory of the host,
  for the second leading queues corresponding to the second memory die, manage a plurality of the second leading queues respectively corresponding to the plurality of submission queues,
  in response to the first read command being fetched from a first submission queue of the plurality of submission queues, select one first leading queue corresponding to the first submission queue from the plurality of first leading queues and store the first identifier in the one first leading queue,
  execute an arbitration process of selecting a leading queue from which the identifier is to be fetched from the plurality of first leading queues, and
  generate the first memory read request when the first identifier is fetched from the one first leading queue.

4. The memory system according to claim 3,
wherein the controller is further configured to:
  manage a correspondence relationship between a plurality of domains and the plurality of submission queues such that one or more submission queues among the plurality of submission queues belong to one domain,
  manage a plurality of first domain queues corresponding to the plurality of domains with respect to the first memory die,
  manage a plurality of second domain queues corresponding to the plurality of domains with respect to the second memory die,
  select one first domain queue corresponding to one domain to which the first submission queue belongs from the plurality of first domain queues in response to generating the first memory read request, and store the first memory read request in the one first domain queue,
  execute an arbitration process of selecting a domain queue from which a memory read request is to be fetched from the plurality of first domain queues based on a plurality of weights associated with the plurality of domains, and
  issue the first memory read request to the first memory die when the first memory read request is fetched from the one first domain queue.

5. The memory system according to claim 4,
wherein the controller is further configured to:
  select one second domain queue corresponding to one domain to which the first submission queue belongs from the plurality of second domain queues in response to generating the second memory read request, and store the second memory read request in the one second domain queue,
  execute an arbitration process of selecting a domain queue from which a memory read request is to be fetched from the plurality of second domain queues based on the plurality of weights, and
  issue the second memory read request to the second memory die when the second memory read request is fetched from the one second domain queue.

6. The memory system according to claim 1,
wherein the controller is further configured to:
  execute, in response to reading the first data part among a plurality of data parts included in the first data from the first memory die, a process of storing the first data part in a read buffer and a process of transferring the first data part to a memory of the host,
  release an area of the read buffer in which the first data part is stored in response to completing the process of transferring the first data part to the memory of the host,
  execute, in response to reading a subsequent data part among the plurality of data parts included in the first data from the first memory die, a process of storing the subsequent data part in the read buffer and a process of transferring the subsequent data part to the memory of the host,
  release an area of the read buffer in which the subsequent data part is stored in response to completing the process of transferring the subsequent data part to the memory of the host,
  execute, in response to reading a last data part of the plurality of data parts included in the first data from the first memory die, a process of storing the last data part in the read buffer and a process of transferring the last data part to the memory of the host,
  release an area of the read buffer in which the last data part is stored in response to completing the process of transferring the last data part to the memory of the host,
  execute, in response to reading the second data part included in the second data from the second memory die after the last data part is transferred to the memory of the host, a process of storing the second data part in the read buffer and a process of transferring the second data part to the memory of the host, and
  release an area of the read buffer in which the second data part is stored in response to completing the process of transferring the second data part to the memory of the host.

7. The memory system according to claim 6,
wherein the controller is further configured to assign a storage area of a static RAM as the read buffer, when an available storage area having a size equal to or larger than a first size exists in the static RAM.

8. The memory system according to claim 7,
wherein the controller is further configured to assign a storage area of a dynamic RAM as the read buffer, when the available storage area having the size equal to or larger than the first size does not exist in the static RAM.

9. The memory system according to claim 1,
wherein the controller is further configured to manage the plurality of read requests stored in the first read request queue by using a linked list for linking the plurality of read requests in the order from the read request corresponding to the head cluster to the read request corresponding to the last cluster.

10. A method of controlling a plurality of memory dies, the method comprising:
in response to receiving a first read command requesting a reading of data to be read from a host, dividing, by a controller, the data to be read into a plurality of data parts corresponding to a plurality of clusters, and generating a plurality of read requests each including memory address information indicating a storage location of a non-volatile memory in which a corresponding data part of the plurality of data parts is stored,
storing, by the controller, the plurality of read requests in a first read request queue associated with a first identifier assigned to the first read command such that the plurality of read requests are linked in an order from a read request corresponding to a head cluster of the plurality of clusters to a read request corresponding to a last cluster of the plurality of clusters,
storing, by the controller, the first identifier in a first command queue corresponding to a first memory die, the first memory die storing a first data part of the plurality of data parts corresponding to the head cluster,
in response to storing the first identifier in the first command queue, specifying, by the controller, a first storage area of the first memory die, the first storage area storing a first data which is associated with a head of the data to be read and includes at least the first data part of the plurality of data parts, and wherein specifying the first storage area is performed by referring to the plurality of read requests stored in the first read request queue, from the read request corresponding to the head cluster,
generating, by the controller, a first memory read request for reading the first data from the first storage area of the first memory die,
issuing, by the controller, the first memory read request to the first memory die,
in response to one or more unprocessed read requests of the plurality of read requests remaining in the first read request queue, transferring, by the controller, the first identifier from the first command queue to a second command queue corresponding to a second memory die, the second memory die storing a second data part of the plurality of data parts, the second data part corresponding to a head cluster of the one or more unprocessed read requests,
in response to transferring the first identifier to the second command queue, specifying, by the controller, a second storage area of the second memory die, the second storage area storing a second data at a head of remaining data of the data to be read, the second data including at least the second data part of the plurality of data parts, and wherein specifying the second storage area comprises referring to the one or more unprocessed read requests stored in the first read request queue, from an unprocessed read request corresponding to a head cluster of one or more clusters corresponding to the remaining data,
generating, by the controller, a second memory read request for reading the second data from the second storage area of the second memory die, and issuing, by the controller, the second memory read request to the second memory die.

11. The method of claim 10, further comprising:
managing, by the controller and for the first command queue corresponding to the first memory die:
a first leading queue for storing an identifier of a read command for which a read process of a head cluster has not started, and
a first following queue for storing an identifier of a read command for which the read process of the head cluster has already started,
managing, by the controller and for the second command queue corresponding to the second memory die:
a second leading queue for storing an identifier of a read command for which a read process of a head cluster has not started, and
a second following queue for storing an identifier of a read command for which the read process of the head cluster has already started,
storing, by the controller, the first identifier in the first leading queue corresponding to the first memory die,
transferring, by the controller, the first identifier from the first leading queue corresponding to the first memory die to the second following queue corresponding to the second memory die, and
executing, by the controller, a process of generating the second memory read request based on the first identifier transferred to the second following queue corresponding to the second memory die, the process of generating the second memory read request having priority over a process of generating another memory read request for reading another data from the second memory die based on the identifier stored in the second leading queue corresponding to the second memory die.

12. The method of claim 11, further comprising:
managing, by the controller and for the first leading queues corresponding to the first memory die, a plurality of the first leading queues respectively corresponding to a plurality of submission queues on a memory of the host,
managing, by the controller and for the second leading queues corresponding to the second memory die, a plurality of the second leading queues respectively corresponding to the plurality of submission queues,
in response to the first read command being fetched from a first submission queue of the plurality of submission queues, selecting, by the controller, one first leading queue corresponding to the first submission queue from the plurality of first leading queues and store the first identifier in the one first leading queue,
executing, by the controller, an arbitration process of selecting a leading queue from which the identifier is to be fetched from the plurality of first leading queues, and
generating, by the controller, the first memory read request when the first identifier is fetched from the one first leading queue.

* * * * *